United States Patent
Sun

(10) Patent No.: US 12,444,954 B2
(45) Date of Patent: Oct. 14, 2025

(54) SYSTEMS AND METHODS FOR BLACKOUT ROTATION ENABLED CONTROL OF POWER DISTRIBUTION SYSTEMS

(71) Applicant: Mitsubishi Electric Research Laboratories, Inc., Cambridge, MA (US)

(72) Inventor: Hongbo Sun, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 530 days.

(21) Appl. No.: 17/929,365

(22) Filed: Sep. 2, 2022

(65) Prior Publication Data
US 2024/0088676 A1 Mar. 14, 2024

(51) Int. Cl.
*H02J 3/46* (2006.01)

(52) U.S. Cl.
CPC .......... *H02J 3/466* (2020.01); *H02J 2203/10* (2020.01); *H02J 2203/20* (2020.01)

(58) Field of Classification Search
CPC .......... H02J 2203/10; H02J 2203/20
See application file for complete search history.

(56) References Cited

U.S. PATENT DOCUMENTS

| | | | |
|---|---|---|---|
| 8,810,421 B2 | 8/2014 | Deaver, Sr. et al. | |
| 2013/0226358 A1* | 8/2013 | Rudkevich | H02J 3/06 700/286 |
| 2014/0249688 A1* | 9/2014 | Ansari | H02J 3/381 700/297 |
| 2016/0099567 A1* | 4/2016 | Sun | H02J 3/144 700/296 |
| 2020/0153273 A1* | 5/2020 | Sun | H02J 3/0012 |
| 2022/0115867 A1* | 4/2022 | Ratnayake | H02J 3/0012 |
| 2023/0074995 A1* | 3/2023 | Lee | H02J 3/50 |

FOREIGN PATENT DOCUMENTS

WO WO-2023027700 A1 * 3/2023

OTHER PUBLICATIONS

"Hongbo Sun et al., Flex-Grid: A Dynamic and Adaptive Configurable Power Distribution System, 2015, pp. 1-6, https://ieeexplore.ieee.org/document/7232488" (Year: 2015).*

(Continued)

*Primary Examiner* — Santosh R Poudel
(74) *Attorney, Agent, or Firm* — Gene Vinokur

(57) ABSTRACT

A control system collects a graph-based representation of the power distribution system as a radial tree of nodes connected by edges. Each node represents a section of the power distribution system isolated by switches and each edge represents a switch that connects a section represented by the node with a neighboring section represented by the neighboring node. Each node has a property of power demand of a corresponding section governed by a difference between demanded and available energy for the section, and each edge has a property constraining throughput of energy through the switch in a direction of a power flow. The control system solves an optimization problem to determine the states of the edges and controls the switches based on the optimized states of the corresponding edges.

20 Claims, 21 Drawing Sheets

(56) References Cited

OTHER PUBLICATIONS

Wan et al. Multi view information bottleneck representation learning. The thirty fifth aaai conference on artificial intelligence (AAAI 21). pp 10085-10092.

Shaghayegh Zalzar, Ettore Bompard, Gianfranco Chicco, Tao Huang, Marta Poncela-Blanco, Alessandro Zani, and Gianluca Fulli, "A Multi-area Assisted Rotational Load Shedding Plan for Mutual Support of Power Systems Under Abnormal Situations". IEEE PES Innovative Smart Grid Technologies Europe (ISGT-Europe), Sep.-Oct. 2019, pp. 1-5.

Ahmed Bin-Halabi, Adnan Nouh, and Mohammad Abouelela, "Interactive Energy Management System to Avoid Rolling Blackouts", 5th International Conference on Electric Power and Energy Conversion Systems (EPECS), Apr. 2018.

\* cited by examiner

SYSTEMS AND METHODS FOR BLACKOUT ROTATION ENABLED CONTROL OF POWER DISTRIBUTION SYSTEMS

TECHNICAL FIELD

The present disclosure relates generally to electric power systems, and more particularly to blackout rotation control for power distribution systems.

BACKGROUND

Blackout rotation or rolling blackout is an almost inevitable measure that power distribution entities have to resort to in order to ensure the best demand response. They generally result from insufficient generation capacity or inadequate transmission infrastructure to deliver power to areas where it is needed. Blackout rotations are also used as a response strategy to cope with reduced output beyond reserve capacity from power stations taken offline unexpectedly, such as an extreme weather event, a natural disaster or the like. Fair blackout rotation is an objective that all power distribution and generation entities strive to achieve. Blackout rotation schemes are usually created by using heuristic rules-based approaches. However, such approaches may not work well when the outage scenario is complicated and needs a longer time horizon and larger geographical region coordination. Also, distribution systems usually do not have sufficient flexibility and resiliency to facilitate effective load isolation, power supply rerouting, and local resource backup. As a consequence, fair rolling blackouts might hardly be achieved. For example, most consumers in the affected service area might experience a blackout. In contrast, some critical consumers could experience multiple blackouts while others could experience no blackouts at all, depending on where they are located.

Conventional electrical power systems have a structure that is a combination of central generating stations, power transmission systems, and distribution and utilization systems. Such systems enforce blackout rotations as per rule-based approaches which may be defined based on historical consumption data and outage data, some predefined priority of geographical regions, and similar static data. Any optimization technique that may be applied to such systems is constrained by the dimensionality of the structure of the electrical power systems. As such, many optimization techniques that can provide a greater degree of flexibility in terms of fairness in the blackout rotations, may not be implementable due to such fixed dimensionality.

Accordingly, there is a need for flexible schemes and approaches for achieving fair blackout rotations that are optimized considering key factors associated with power distribution. There is also a need for more advanced tools to achieve fair blackout rotation and more cost-effective measures to enable fairer blackout rotation.

SUMMARY

With the increasing frequency, intensity, and duration of natural disasters and blackouts, disaster-induced generation deficiency and network failures have become inevitable. Therefore, blackout rotation becomes a necessary means for customers to share the suffering of disastrous impacts, and the responsibility for maintaining system stability.

It is an object of some embodiments to provide a system and a method for controlling a power distribution system. Additionally or alternatively, it is an object of some embodiments to provide such a control method that is suitable for controlling a blackout rotation in the operation of the power distribution systems. Additionally or alternatively, it is an object of some embodiments to disclose a method for fair blackout rotation for power distribution systems under extreme operating events. Additionally or alternatively, it is an object of some embodiments to provide a method for fair blackout rotation suitable for large-scale power distribution systems suffering from the curse of dimensionality in optimization problems.

Rolling blackouts, or rotating outages, are systematic, temporary power outages that help balance the supply and demand of electricity in the power grid. Usually, the operator of the power grid calls for rolling blackouts and administers temporary outages to one area at a time to limit the duration of the outages for each area. In these situations, the blackout rotation is based on rules accepted for a particular power distribution system. However, the rule-based blackout rotation is often suboptimal for a specific type of power outage or a specific consumer of the power distribution system.

To that end, it is an object of some embodiments to provide a method for controlling a power distribution system suitable for optimizing the principles of blackout rotation. In other words, it is an object of some embodiments to replace the rule-based blackout rotation with the optimization-based blackout rotation. However, the optimization-based techniques call for a power flow analysis of large-scale power distribution systems and suffer from the curse of dimensionality problems. Hence, it should not come as a surprise, that optimization-based techniques have not been adopted for controlling a blackout rotation in the operation of power distribution systems.

To address this problem, some embodiments replace a structural model of a power distribution system with a meta-structure of different dimensions and replace a power flow model with a model that balances the internal power of the meta-structure for optimizing power flow analysis in the system. The objective of such replacements is to provide a new optimization space suitable for power flow analysis allowing to reduce the computational burden and reduce the likelihood of the curse of dimensionality in optimization problems in controlling the power distribution systems.

That is, to avoid directly modeling large-scale power flow resulting in the curse of dimensionality problem for system optimization, some embodiments first partition the power distribution system into a set of feeder sections which are separated by normally-open or normally-closed switchable devices and then simplify the distribution system into a connected network by modeling feeder sections as its nodes and switches as links. The power flow model for the system is replaced with an internal power balance model to balance local generation and load for each section when isolated, and an external power balance model to coordinate power exchange with adjacent sections through switches when energized. A small-scale power flow calculation can be used to check if any power flow violation exists in any feeder section. If a violation is found, the switch power flow limits can be adjusted/reduced according to the sensitivity of violations with power injections at the switches to clear the violations. Each feeder section's energized status can be determined by the states of the switches residing on the paths between the section and available substations/feeders. In some implementations, the energy lost due to isolation for the section is determined based on local renewable generation, storage dispatch, and load demand.

To that end, some embodiments use a graph-based representation of the structure of a power distribution system.

Each node of the graph is a section, e.g., a feeder section, of the power grid separated by switches from other sections of the power grid. The switches may be of different types, such as normally-closed or normally-open switches. Some example embodiments model a switch with a binary variable to represent its open/closed status, and a set of continuous variables to represent the amounts of currents/powers flowing through the switch. The variables may be subjected to a set of thresholds for maximal currents/powers allowed to flow through the switch. In some example embodiments, the thresholds may also be configurable to represent operational requirements, such as maximum powers imposed by a demand response program.

When all switches associated with a section are placed in the open positions, the section is isolated from the other parts of the grid. As such, the power demand can be estimated for the entire section rather than for an individual load of the section. In other words, the section can be treated as a load with an energy demand of a difference between the energy production estimated to be produced by the generators inside the section, if any, and the energy consumption estimated to be consumed by loads of the section. This node representation allows for reducing the dimensionality of the optimization problem.

The switches connect the power flow between each feeder section and other sections of the power distribution system. Hence, the switches are represented as edges connecting nodes of the graph-based representation. While the property of a node is its power demand (fixed or varying over time), the property of an edge is its potential throughput of supplying the power through the switch. In some example embodiments, the graph is a radial tree starting from a root node that represents the source of powering the distribution system, such as the main grid. Hence, the throughput of a switch connecting a node to its child is the minimum of the throughput of the switch defined by its type (open or close) and the throughput of the edges leading to the node defining the maximum flow of the energy the switch can receive. Notably, the edges are directional, and a pair of nodes can be connected by edges in one or both directions with different throughputs.

It should be noted, that given this graph-based representation, the state of the entire power distribution system can be represented as a function of the states of the switches that pass or block the flow of the energy. Hence, the effect of the internal complexities of different elements of the power distribution system such as individual demand of different loads, power storage, power generation, type, and cost of the production of the power can be reduced (or aggregated) or just ignored by the optimization.

Additionally, this graph-based representation is advantageous for disaster-induced generation deficiency that can be reflected in the properties of the nodes and the edges. Since the graph is a radial tree that expands outwards, i.e., radially from a root node, each node is connected to the root node through one or multiple radial paths. If at least one edge on a radial path leading to the node is removed or opened, the entire path is broken. The edge removal can be intentional or unintentional, i.e., controlled or uncontrolled. For example, the unintentional removal may be caused by an adversarial event such as a natural disaster and/or unplanned event. The intentional removal can be caused by optimization of the power distribution in case of energy deficiency. This intentional removal can be implemented by opening the switch.

Hence, the configuration of the radial tree can be changed in case of natural disasters and/or unplanned events. However, if the edge on the tree is present, the edge is considered to be able for passing energy, given its throughput which can also be changed by the natural event and/or as the result of the optimization. Whether the switch should or should not pass the energy is governed by the state of the switch and the corresponding state of the edge.

By way of examples, the constraint defined by the graph-based representation includes one or a combination of a potential of the power exchange between the nodes, a direction of the flow of the power between the nodes, a throughput, i.e., maximum of power flow between the nodes, a constraint on the power balance between power flowing into and out of each non-isolated node, dependency of the power flow between nodes on power exchange between other nodes, a radial constraint on a radial path formed by multiple edges. However, in some implementations, the constraint may be agnostic to the types of switches, for e.g., the property of the edge may not specify the type of the corresponding switch. Such an approach simplifies the optimization problem, thereby reducing the computational burden and complexity which in turn leads to faster control action.

As such, the graph-based representation of a power distribution system according to some embodiments allows the formulation of the optimization problem using the following principles: optimize a cost function of properties of nodes such as power demand, power shortage amount, power shortage duration, power shortage frequency as a function of the states of edges given the radial tree of the graph defining relationships and properties of the nodes and the edges as a constraint. Notably, the graph-based representation of the meta-structure of the grid is differentiable allowing for various optimization techniques.

To take into account various interests and enable fair blackout rotation, some embodiments model the blackout rotation as a multi-objective optimization problem to balance one or a combination of objectives including minimization of lost energy and minimization of switch operations to represent the power grid's needs, minimization section outage duration, and minimization of section outage frequency to represent customers' requirements, and minimization of outage frequency differences among feeder sections, and minimization of outage frequency differences among feeder sections to achieve fair blackout rotation goals.

Some embodiments are based on the understanding that the graph-based representation of the power distribution system can consider specifics of the effect of an adversarial event on the power distribution. For example, the adversarial event can break the switch and the edge of the graph-based representation corresponding to the link can be removed, and/or the definition of the node can be changed. For example, the adversarial event can reduce the available power from the main grid, and the amount of power to distribute is reduced accordingly. For example, the storage or generation of the power within the feeder section is reduced, and the property of the node reflecting the power demand is changed accordingly.

Some example embodiments utilize a cost function of the properties of the nodes having multiple objectives. For example, in some embodiments, the cost function has six different cost metrics defining the cost function to be optimized. Such multi-objective optimization provides a greater deal of fairness in the blackout rotation. The objectives include (1) minimizing the total amount of lost energy, (2) minimizing the total number/frequency of switching operations, (3) minimizing the maximum outage hours, (4) minimizing the maximum outage frequency/times, (5) minimizing the maximum difference of outage hours between any two feeder sections, and (6) minimizing the maximum difference of outage frequencies between two feeder sections.

However, solving such a multi-objective cost function may be time-consuming and extensive and thus poses a computational challenge. Towards this end, some example embodiments, transform the multi-objective optimization into a single objective optimization by defining the singular objective as maximizing a sum of a first item defined as a weighted sum of satisfied degrees for all multiple objectives, and a second item defined as minimal of weighted satisfied degree among all multiple objectives. The multi-objective optimization is converted into a single-objective optimization by modeling the satisfaction of each objective using a non-linear generalized Rectified Linear Unit (ReLU) function and defining a so-called overall satisfaction as its objective. The overall satisfaction of the single-objective optimization is defined as a combination of satisfied degree summation for each objective of the multi-objective optimization multiplied by its weighting factor, and a minimal satisfied degree among all objectives determined according to a division of the satisfied degree over its weighting factor for each objective. Such definition enables the maximization of total satisfaction for all stakeholders while maximally protecting the interest of the least satisfied ones.

Due to the non-linearity characteristics of generalized ReLU functions, logic operations required by section isolation status determination and storage contributions, and multiplication operations between binary and continuous variables, the above-formulated problem is a non-linear optimization problem that may be difficult to solve and solution consistency might not be guaranteed. Therefore, some embodiments use a directed feasible region approach to convert each non-linear item as an optimization problem to seek a solution within a feasible region bounded by linear equations and direct its solution searching using a linear objective function. The generated optimization is then embedded into the optimization model for blackout rotation to replace the original nonlinear items. By doing so, the nonlinear optimization is converted into a mixed-integer linear optimization problem, which reduces computational complexity and the possibility of divergence.

Some example embodiments are also based on a recognition that different approaches can be used to solve the optimization problem associated with the power distribution. Examples of the solutions include non-linear optimization problems with mixed binary and continuous variables and logic operations, a mixed-integer linear programming problem (MILP), and a machine learning solution with a physics-informed neural network (PINN) that solves the optimization problem by training a neural network to minimize a lost function including the cost function.

Some example embodiments solve the optimization problem thus formulated, to determine the states of the edges of the graph-based representation governing the power flow of available energy optimizing a cost function of the properties of the nodes for optimizing the rolling blackout, given the graph-based representation as a constraint. The optimized states of the edges thus determined are transformed into control commands for states of one or more switches of the power distribution system. The control commands are sent to the switches to cause a change in the power flow of available energy in the power distribution system.

In some implementations, the control commands are determined based on the states of the edges and the types of switches represented by the edges. For example, the types include always opened or always closed types. Hence, if, for example, the switch has an always-open type, the current state of the switch is being open, and the optimized state of this switch is also determined as open, no command can be sent. A similar situation is with always closed types of switches. In other words, the commands are transmitted only to change the states of the switches from the current to the opposite states.

In order to achieve the aforementioned objectives and advantages, some example embodiments provide control systems, control methods, and programs for controlling the power flow of available energy in the power distribution system.

For example, some example embodiments provide a control system for controlling the power flow of available energy in the power distribution system. The control system encompasses one or more processors and a memory having instructions stored thereon, the processor executes the instructions causing the control system to collect a graph-based representation of the power distribution system as a radial tree of a plurality of nodes connected by a plurality of edges. Each node of the plurality of nodes in the radial tree represents a section of the power distribution system isolated by one or more switches from other parts of the power distribution system if one or more switches are at open positions. Further, each of the plurality of nodes has a property of power demand of a corresponding section governed by a difference between energy available within the corresponding section and energy demanded by loads of the corresponding section. Furthermore, for each of the plurality of nodes, an edge of the plurality of edges connecting a corresponding node of the plurality of nodes with a neighboring node of the plurality of nodes represents a connecting switch that connects a corresponding section with a neighboring section represented by the neighboring node. Furthermore, the edge has a property constraining throughput of energy through the connecting switch in a direction of a power flow to be not greater than the throughput of the connecting switch defined by a type of the connecting switch and a state of a parent edge connecting the corresponding node with a parent node of the plurality of nodes.

The state of each node of the plurality of nodes defines an amount of net power demanded by a corresponding section of the power distribution system. Having collected the graph-based representation of the power distribution system, the processor of the control system is further configured to solve an optimization problem to determine a state of each of the plurality of edges of the graph-based representation governing the power flow of available energy optimizing a cost function of properties of the plurality of nodes for optimizing the rolling blackout given the graph-based representation of the power distribution system as a constraint. The processor then transforms the determined state of each of the plurality of edges into control commands for states of at least some switches of the power distribution system and submits the control commands to at least some switches of the power distribution system to cause a change in the power flow of the available energy.

Some example embodiments also provide a method for controlling a power flow of available energy in the power distribution system. The method comprises a step of collecting a graph-based representation of the power distribution system as a radial tree of a plurality of nodes connected by a plurality of edges. Each node of the plurality of nodes in the radial tree represents a section of the power distribution system isolated by one or more switches from other parts of the power distribution system if one or more switches are at open positions. Further, each of the plurality of nodes has a property of power demand of a corresponding section governed by a difference between energy available within the corresponding section and energy demanded by loads of the corresponding section. Furthermore, for each of the plurality of nodes, an edge of the plurality of edges connecting a corresponding node of the plurality of nodes with a neighboring node of the plurality of nodes represents a connecting switch that connects a corresponding section with a neighboring section represented by the neighboring node. Furthermore, the edge has a property constraining throughput of energy through the connecting switch in a direction of a power flow to be not greater than the throughput of the connecting switch defined by a type of the connecting switch and a state of a parent edge connecting the corresponding node with a parent node of the plurality of nodes.

The state of each node of the plurality of nodes defines an amount of net power demanded by a corresponding section of the power distribution system. The method then proceeds to solve an optimization problem to determine a state of each of the plurality of edges of the graph-based representation governing the power flow of available energy optimizing a cost function of properties of the plurality of nodes for optimizing the rolling blackout given the graph-based representation of the power distribution system as a constraint. The method further comprises a step of transforming the determined state of each of the plurality of edges into control commands for states of at least some switches of the power distribution system and a step of submitting the control commands to at least some switches of the power distribution system to cause a change in the power flow of the available energy.

Additionally or alternatively, some embodiments consider the evolution of blackouts during an adversarial weather event. In these embodiments, besides managing the blackout rotation based on a static time horizon, the blackout rotation is also generated in a temporal rolling manner to revisit and update disaster situations throughout the disaster period. This enables the blackout rotation to adapt to situation changes and generate a better rotation scheme to take pre-existing conditions into account.

In this regard, some example embodiments also provide a method for optimizing the resilience enhancement in the distribution systems to enable fairer blackout rotation for future extreme weather events. Besides the previously-mentioned six objectives for outage impact mitigation and fairness, some embodiments also include the minimization of maximum connected net load and average N−1 contingency duration for feeder sections, and maximization of tie pickup capacities to regulate the size of feeder sections for more effective load isolation and restoration, the maximization of storage reserved energy for power shortage and blackout scenarios, and the maximization of storage energy discharging during black start events to optimize storage energy reserve and dispatch for best utilization of the storage capabilities.

Additionally or alternatively, a minimization of operation cost is used to determine optimal system configuration and storage usage to minimize the total cost of substation power supply, renewable generation wearing cost, switch operation cost, load shed cost, and storage charging/discharging wearing cost. Minimization of investment cost is also included to represent the budget constraints.

For example, some embodiments are based on a recognition that adding the switches to the power distribution system would change the configuration of the graph-based representation of the power distribution system according to some embodiments. Moreover, adding extra switches, i.e., the switches that would normally not be necessary, would increase the flexibility of the graph and may benefit optimization of the power flow. To that end, some embodiments add extra switches in a normally closed, and normally open state to the power distribution system to increase such flexibility. For example, in some implementations, the power distribution system includes a radial path with at least two switches in the normally closed state to reduce potential blackout scope and duration and at least one switch in the normally open state to enable rerouting to other sources.

The resilience enhancement model of several embodiments balances different interests with additional switch and storage placement into the distribution system at strategical locations or rating to meet system operational requirements under various operation scenarios, including normal operation, power shortages, network failures, and black start. The enhanced power distribution system provides more flexibility for the distribution system to implement fairer blackout rotation for customers served by the system.

BRIEF DESCRIPTION OF THE DRAWINGS

The presently disclosed embodiments will be further explained with reference to the following drawings. The drawings shown are not necessarily to scale, with emphasis instead generally being placed upon illustrating the principles of the presently disclosed embodiments.

DETAILED DESCRIPTION

Overview

The present disclosure relates generally to electric power systems, and more particularly to blackout rotation control for a power distribution system.

The present disclosure is presented to control the blackout rotation for a power distribution system when a power shortage from the main grid occurs. Various embodiments consider one or a combination of two scenarios for blackout rotation control. The first one is determining a fair rotation scheme under a given system configuration. This scenario controls the power grid during rolling blackouts to achieve fairness for all users with given placement for switches and storage in the grid. The second scenario is enhancing the power grid to achieve fairer blackout rotation. The second scenario is designing a cost-effective scheme for placing additional automatic switches and storage into the grid with consideration of fair blackout rotation.

'Blackout' as used herein may refer to any scenario in which power supply to a consumer area is cut off or falls below a threshold level. Some probable reasons behind a blackout may include reduced power availability, increased load, sudden reduction in load against supply due to an adversarial event such as weather events and the like. Blackout rotation is a control measure to alter power flow across a distribution system and as such requires controlling one or more electrical production and distribution infrastructures in a power distribution system. From an operational point of view, blackout rotation or rotational load shedding aims to optimize load distribution on power sources and transmission lines while ensuring optimum electrical power demand is met. Implementing a rolling blackout may comprise provisions for effective load isolation, power supply rerouting, and local resource backup.

In these regards, implementing an effective blackout rotation strategy that caters to the objectives associated with black rotation is of utmost importance. The technical importance associate with an effective blackout rotation scheme can be understood from the fact that these strategies help effectively dispose available electrical power in times of need such as during load-production mismatch, an extreme weather event and the like. During such adversarial events, it might be required that power supply to one or more geographic areas be shut or reduced, whereas at the same time the generation may not synchronously stop or reduce. As such, these strategies also help in avoiding transmission equipment failure by effectively routing energy from the production end to consumption end during extreme events.

Figure 1A:
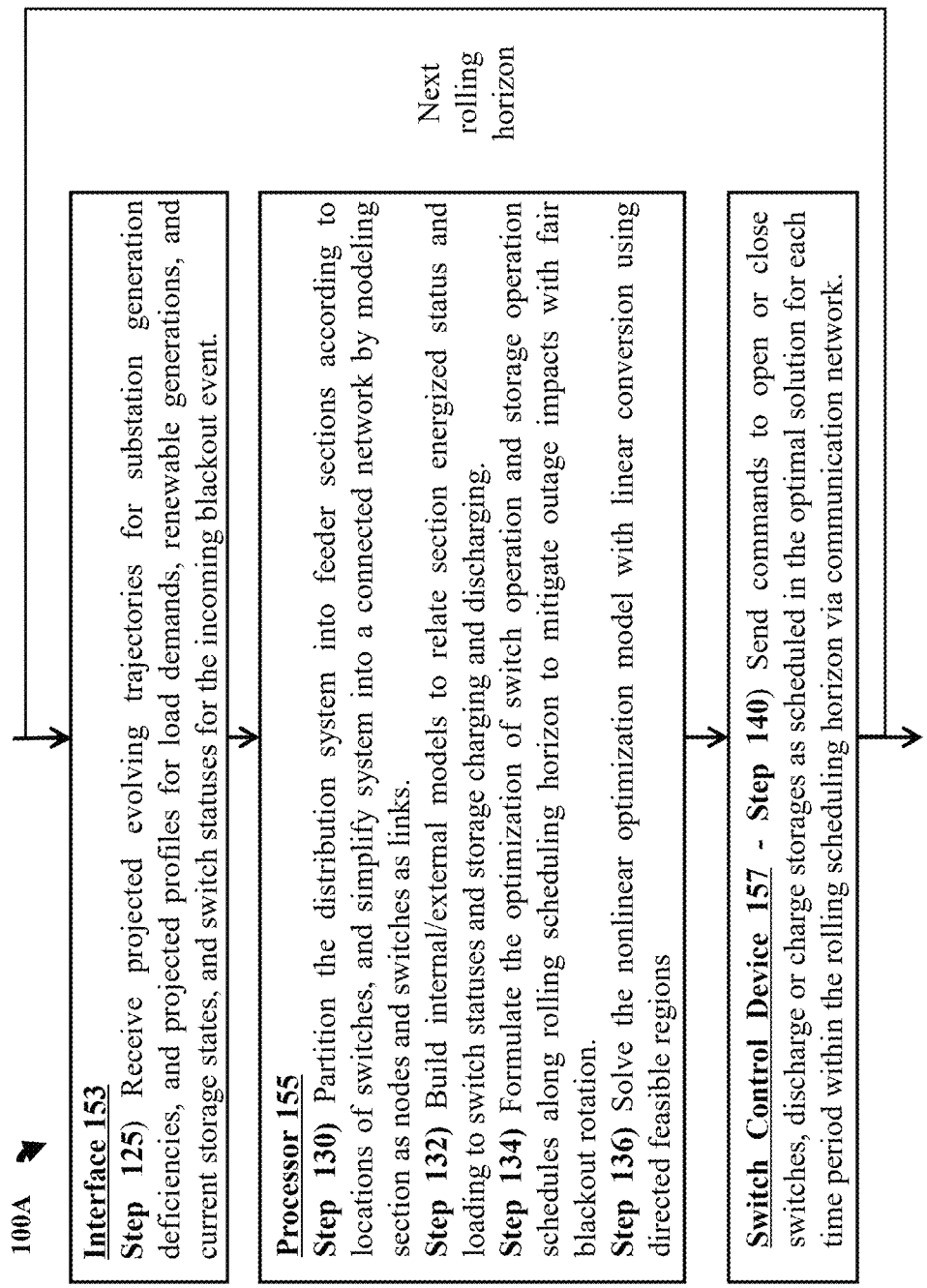
FIG. 1A is a block diagram illustrating a method for controlling blackout rotation for a power distribution system, according to some example embodiments.

Towards these ends, some example embodiments provide methods for controlling blackout rotation. FIG. 1A is a block diagram illustrating one such method for controlling blackout rotation for a power distribution system, according to embodiments of the present disclosure. In some example embodiments, method may be triggered upon detection of an adversarial event such as an extreme weather related event. The computer program instructions pertaining to method 100A may be stored in a memory and may be executed by processing circuitry upon detection of such an adversarial event or alarm. The adversarial event detection may indicate onset of an incoming blackout event for the power distribution system.

Step 125 includes method 100A using an interface 153 to receive projected evolving trajectories for substation generation deficiencies, projected profiles for load demands, renewable generations, and current storage states, and switch statuses for the incoming blackout event via a communication network. The interface 153 may receive the trajectories for substation generation deficiencies from one or more substations, or the power distribution system. The interface 153 may receive the projected profiles for load demands and renewable generations from one or more loads and renewable generators, current storage states from one or more battery energy storage systems, and switch statuses from one or more switching equipment associated with the power distribution system.

Step 130 includes method 100 using a hardware processor 155 to partition the distribution system into feeder sections according to the locations of switches, and simplify the system into a connected network by modeling sections as nodes and switches as links. Towards this end, a graph based structure of the power distribution system may be obtained for example from a database storage.

At step 132 of FIG. 1A, the hardware processor 155 may build internal/external power balance models to relate section energized status and loading to switch statuses and storage charging and discharging.

Step 134 uses the hardware processor 155 to formulate the optimization of switch operation schedules and storage operation schedules along the rolling scheduling horizon to mitigate outage impacts with fair blackout rotation.

Step 136 uses the hardware processor 155 to solve the nonlinear optimization model with linear conversion using directed feasible regions.

Still referring to step 140 of FIG. 1A, includes method 100 to send commands to open or close switches, discharge, or charge storage as scheduled in the optimal solution for each time period within the rolling scheduling horizon using a computing device 157 via a communication network. Upon completion of step 140, the control of steps passes back to step 125 and the steps 125-140 are repeated for the next rolling horizon if there remains any rolling horizon for which rolling blackout needs to be optimized. In case there exists no next rolling horizon, the method 100A is terminated.

Figure 1B:
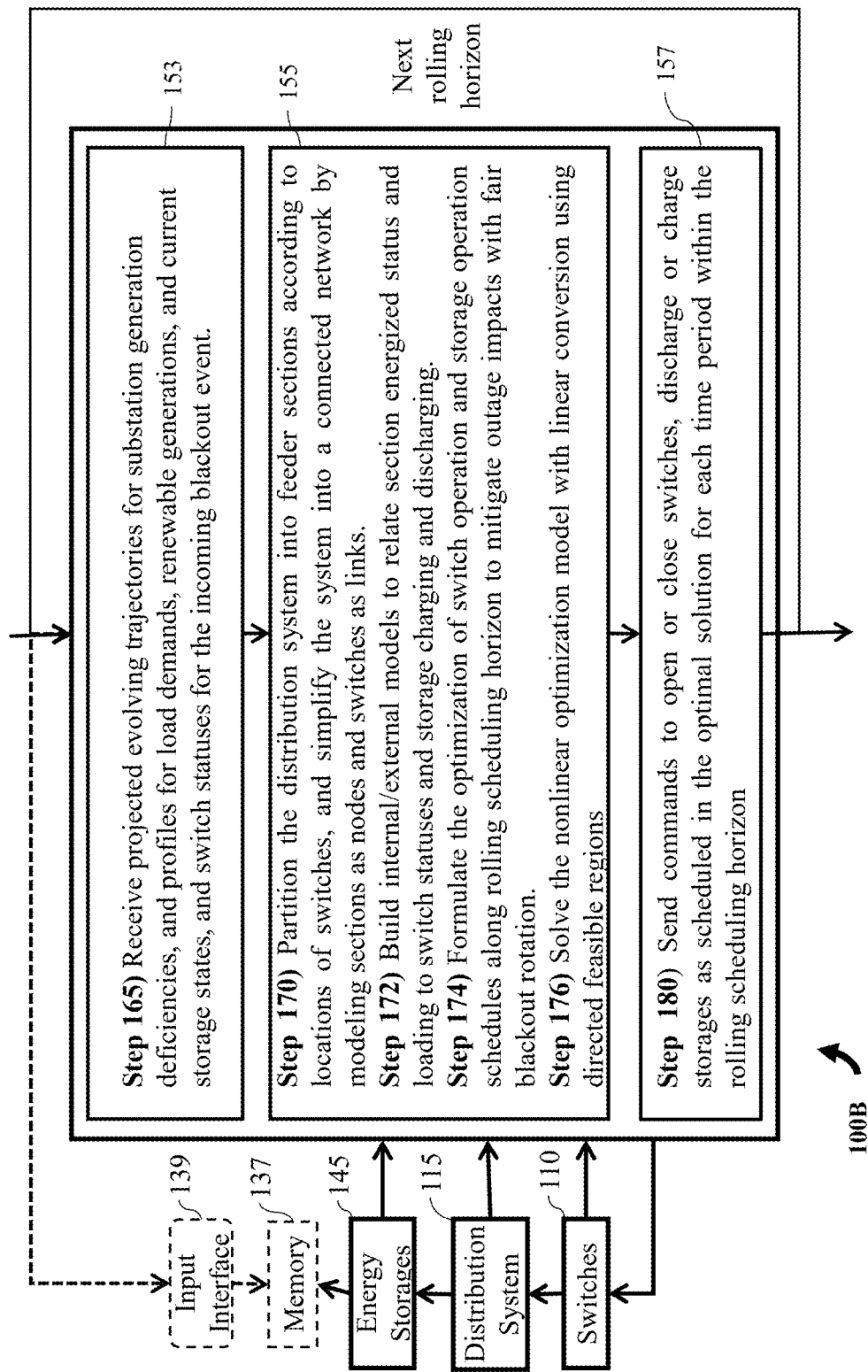
FIG. 1B is a schematic illustrating components and steps of controlling blackout rotation for a power distribution system under extreme weather events, according to some example embodiments.

FIG. 1B is a schematic illustrating components and steps of controlling blackout rotation for a power distribution system under extreme weather events, according to embodiments of the present disclosure.

FIG. 1B can include a hardware processor 155 in communication with an input interface 139, a memory 137, an interface 153, a computing device 157. The computing device 157 can be connected to a set of switches 110 that are installed in the distribution system 115. The distribution system can have a set of energy storages 145 to reduce blackout lost energy and implement black start for the distribution system 115. The blackout rotation control system implemented with method 100B can control the set of switches 110 and storages 145 as well as can send and receive information. It is contemplated the hardware processor 155 can include two or more hardware processors depending upon the requirements of the specific application. Certainly, other components may be incorporated with method 100 including input interfaces, output interfaces and transceivers.

Still referring to FIG. 1B, aspects of the method 100B include step 165 of using an interface 153 to receive projected evolving trajectories for substation generation deficiencies, and projected profiles for load demands, renewable generations, and current storage states, and switch statuses for the incoming blackout event via a communication network.

Step 170 of method 100B includes using a hardware processor 155 to partition the distribution system into feeder sections according to locations of switches, and simplify the system into a connected network by modeling section as nodes and switches as links.

Step 172 includes building internal/external power balance models to relate section energized status and loading to switch statuses and storage charging and discharging.

Step 174 includes formulating the optimization of switch operation and storage operation schedules along the rolling scheduling horizon to mitigate outage impacts with fair blackout rotation. Rolling blackouts, or rotating outages, are systematic, temporary power outages that help balance the supply and demand of electricity in the power grid. Usually, the operator of the power grid calls for rolling blackouts and administers temporary outages to one area at a time to limit the duration of the outages for each area. In these situations, the blackout rotation is based on rules accepted for a particular power distribution system. However, the rule-based blackout rotation is often suboptimal for a specific type of power outage or a specific consumer of the power distribution system.

To that end, it is an object of some embodiments to provide a method for controlling a power distribution system suitable for optimizing the principles of blackout rotation. In other words, it is an object of some embodiments to replace the rule-based blackout rotation with the optimization-based blackout rotation. However, the optimization-based techniques call for a power flow analysis of large-scale power distribution systems and suffer from the curse of dimensionality problems. Hence, it should not come as a surprise, that, to the best of available knowledge, optimization-based techniques have not been adopted for controlling a blackout rotation in the operation of power distribution systems.

Step 176 includes solving the nonlinear optimization model with linear conversion using directed feasible regions.

Step 180 of the method 100B includes sending commands to open or close switches, discharge or charge storage as scheduled in the optimal solution for each time period within the rolling scheduling horizon using a computing device 157 via a communication network.

The steps can be repeatedly executed for a rolling scheduling horizon. For each execution, the pre-conditions for the last execution are taken into account when evaluating the objective functions.

Figure 1C:
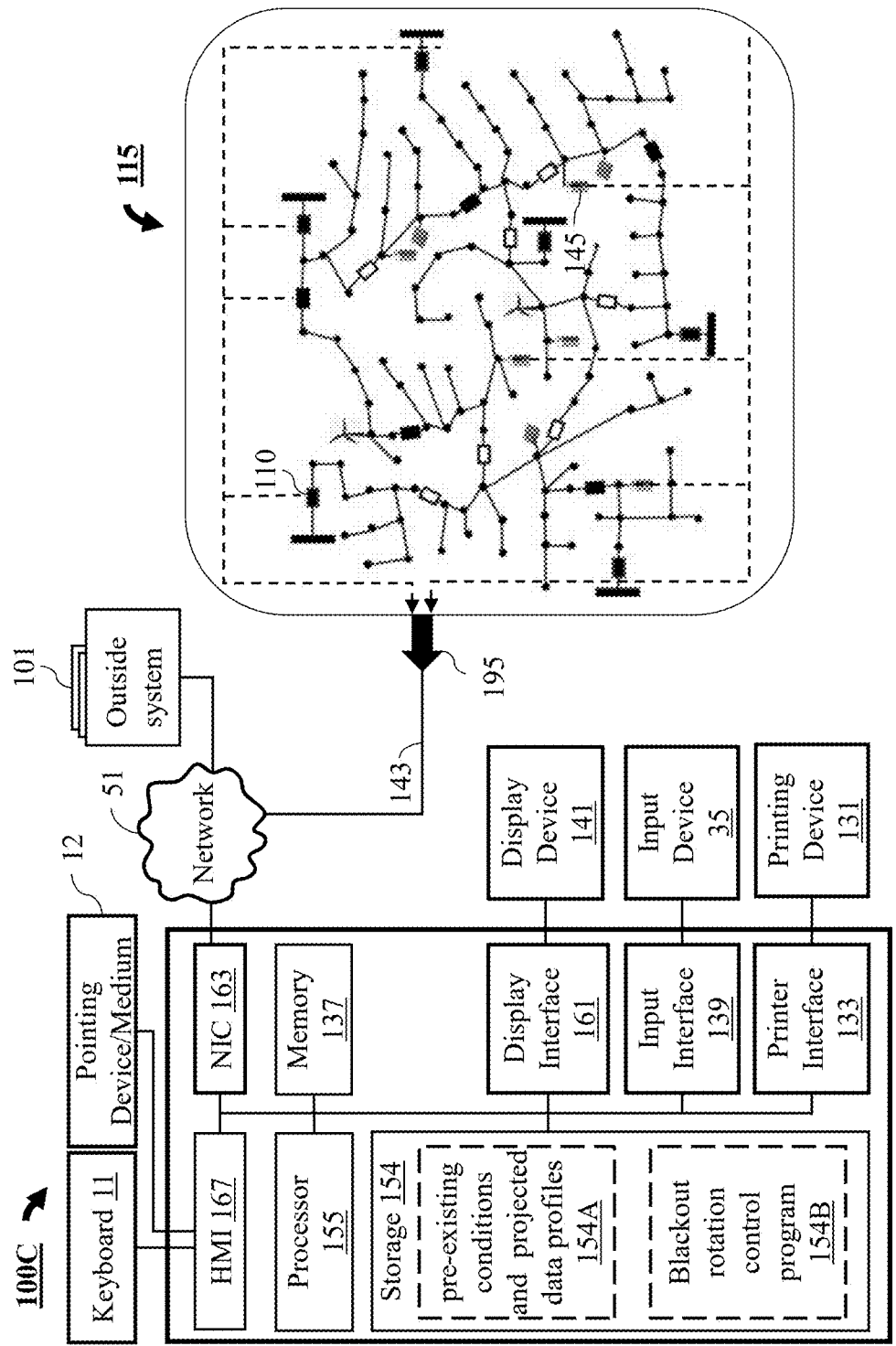
FIG. 1C is a block diagram illustrating a blackout rotation control system for a power distribution system under extreme weather events, according to some example embodiments.

FIG. 1C is a block diagram illustrating a blackout rotation control system 100C for a power distribution system under extreme weather events, according to some embodiments.

The blackout rotation control system 100C includes a human-machine interface (HMI) 167 connectable with a keyboard 11 and a pointing device/medium 12, a processor 155, a storage device 154, a memory 137, a network interface controller 163 (NIC) connectable with a network 51 including local area networks and internet network, a display interface 161 connected to a display device 141, an input interface 139 connectable with an input device 35, and a printer interface 133 connectable with a printing device 131.

The blackout rotation control 100C can receive electric signals 195 indicating statuses or measurements of switchable devices or energy storages arranged in a distribution system 115 via the network 51 connected to the NIC 163. Network 51 is connected to an outside system(s) 101 that can provide control signals to the measurement devices of the distribution system 115 for performing remote control of the measurement devices. Further, the blackout rotation control system 100C can provide the outside system 101 with controlling status data (signals) via network 51 so that the outside system 101 can control switching operation arranged in the distribution system 115. Further, the blackout rotation control system 100C can be controlled from the outside system 101 by receiving control data (signals) of the blackout rotation control via network 51.

The storage device 154 includes pre-existing conditions and projected system parameters 154A with respect to the distribution system 115 and a blackout rotation control program module 154B. The input device/medium 35 may include modules that read programs stored on a computer-readable recording medium (not shown).

For controlling a blackout rotation in the distribution system 115, the blackout rotation control system 100C may receive the status data of the distribution system 115 from the measurement devices included in the distribution system 115.

In accordance with some embodiments of the present invention, the distribution system 115 may include a set of switchable devices, a set of renewable generators, and a set of energy storage structures. The blackout rotation control system 100C uses interface 153 of FIGS. 1A and 1B to receive projected generation, load demand profiles, and measured storage states via network 51 (communication network). The memory 137 can load the computer-executable programs stored in the storage 154, in which the computer-executable programs include a pre-existing condition (such as accumulated outage hours, or times) and projected data profiles 154A of load demand, renewable generation or substation power supplying and a blackout rotation control program (module) 154B configured to control the blackout rotation in the distribution system 115. At least one processor 155 in connection with the memory 137 and the interface 153 are used to perform the blackout rotation control program 154B loaded from the storage 154. For instance, when performed by the processor 155, the blackout rotation control program 154B causes the processor 155 to receive power shortage update and current device or storage statuses from the measurements 195, and the processor 155 determines if a power shortage is caused on the distribution system 115 by comparing available powers supplied through substations with local load demand, renewable generations and storage levels. If a power shortage is identified, the blackout rotation program 154B further requests the processor 155 to provide the projected data profiles from the storage 154, and then through connectivity tracing and power balancing, the program 154B determines a blackout rotation scheme by identifying the switches 110 to isolate the determined feeder sections by disconnecting it from access to all power supplies, and also a storage dispatch scheme by identifying the regulated storages 145 to charge or discharge for adjusting power balance of each feeder section along with projected renewable generations. Then the processor 155 outputs a schedule for switch operation and storage dispatch for the distribution system 115, indicating which switch 110 to operate with what kind of operation and finished before at which time period, and also detailing the charging and discharging statuses and controlled levels of state of charge for each storage 145 in the distribution system. Further, the interface (NIC) 163 can receive the measured signals and power shortage event update (not shown) 195 every preset period of time via network 51 from the distribution system 115.

In some cases, the instructions to start/perform controlling the blackout rotations be transmitted to the blackout rotation control system 100C using the keyboard 11 or from the outside system 101 via the network 51.

Distribution System Automatic Isolation and Restoration

The distribution system isolates a portion of energized sections by automatically operating the switches installed at the sections, and restores load demands by using local renewables and storage when isolated, and external power inputs from adjacent sections when re-energized with the system through corresponding operations of switches along paths from the substations to the section. Each substation may include several feeders.

Figure 2:
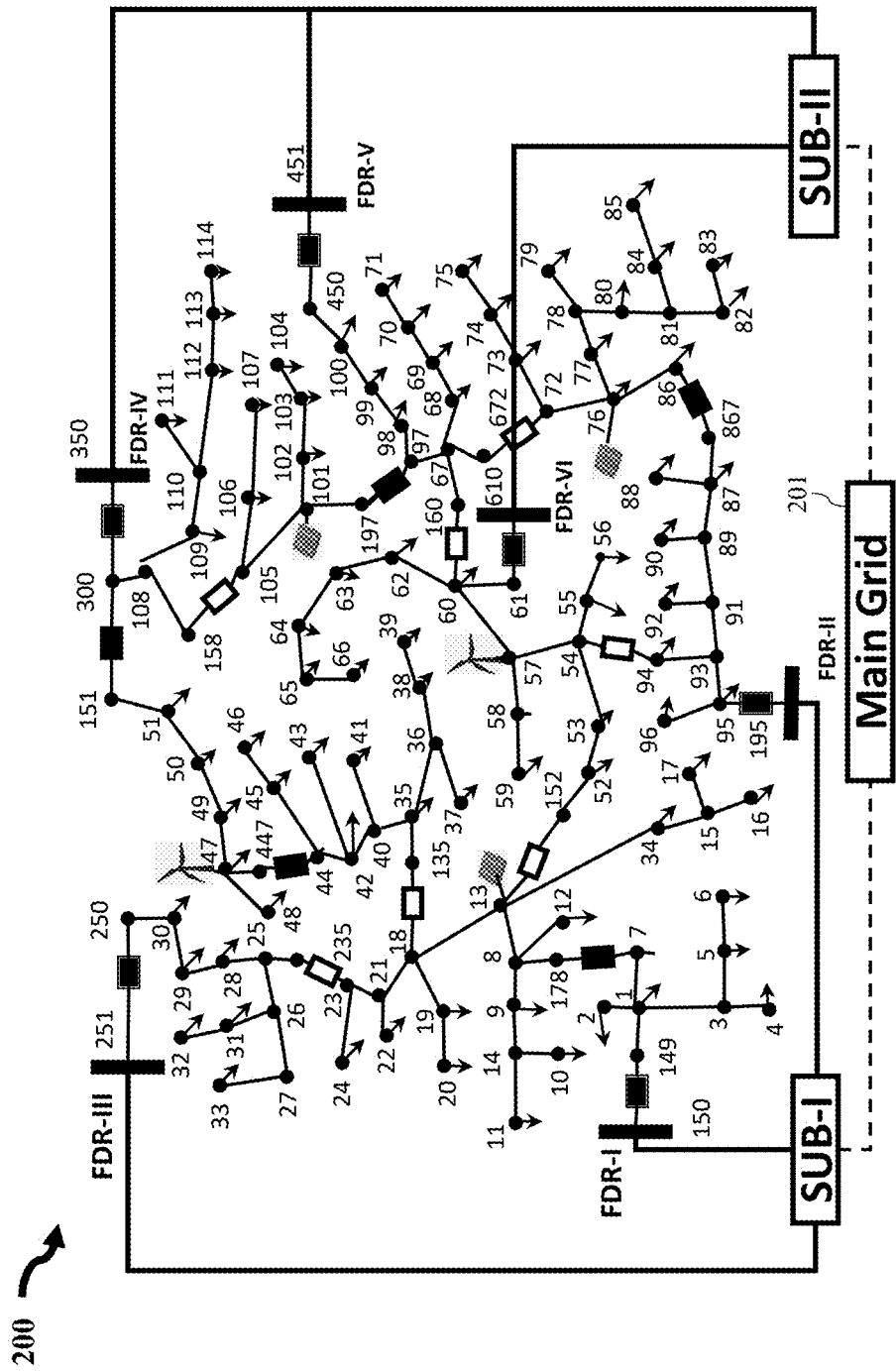
FIG. 2 is a schematic illustrating a power distribution system equipped with tie and sectionalizing switches and renewable distributed generators, according to some example embodiments.

FIG. 2 illustrates an exemplar distribution system 200 modified from the IEEE 123 node test feeder which operates at a nominal voltage of 4.16 kV operated according to some embodiments. As shown in FIG. 2, the main grid 201 provides power to the distribution system 200 through substations. The substation delivers power to the customers through feeders. In FIG. 2, the system 200 includes two substations, SUB-I and SUB-II. The substation SUB-I includes three feeders, FDR-I, FDR-II and FDR-III, and SUB-II includes feeder FDR-IV, feeder FDR-V and feeder FDR-VI.

A feeder, such as any of the feeders FDR-I to FDR-VI, may include a set of loads, local renewable generators, and a battery energy storage system. Each feeder may install several normally closed sectionalizing switches (including one circuit breaker at the feeder head) to enable the feeder to be partitioned into a set of energized sections. A feeder may connect with other feeders through normally open tie switches installed at the boundaries of adjacent feeders.

Still referring to FIG. 2, the exemplar system 200 has three solar plants installed at nodes 13, 76, 101 with capacities 20 kW per phase, and wind plants at 47 and 57 with capacities of 20 kW per phase. The system has six feeders fed at nodes 150,195,251,350,451 and 610, seven tie switches on 13-152, 18-135, 23-235, 158-105, 160-60, 72-672, and 94-54, and eleven sectionalizing switches (including six circuit breakers) on 150-149, 195-95, 251-250, 350-300, 451-450, 610-61, 7-178, 447-44, 97-197, 867-86, and 151-300. Taking FDR-I as an example, it has installed one circuit breaker at branch 150-149, a sectionalization switch at branch 7-178, and three tie switches at 13-152, 18-135 and 23-235 to connect with FDR-VI, FDR-IV, and FDR-III, respectively.

During a power shortage from the power grid, power grid operator has to adjust the operation statuses for sectionalizing and tie switches to cut off power supply for some feeder sections to reach a new balance of power supply and demand. The target for blackout rotation is to determine the optimal switch operation scheme to rebalance power supply and demand dynamically along the power shortage horizon to satisfy diverse or even conflict needs of the system and the customers. Due to large space of switch operation combinations and complicated operational coordination along the power shortage horizon, the blackout rotation problem currently is hard to be modeled and solved as an optimization problem but is usually determined by using heuristic methods instead. The solution optimality is one of the major challenges faced by heuristic rules-based methods when dealing with practical systems. Another concern is the current practice mainly considering the system needs, such as minimizing energy lost but ignore the interests of customers.

Some embodiments replace a structural model of a power distribution system with a meta-structure of different dimensions and replace a power flow model with a model that balances the internal power of the meta-structure for optimizing power flow analysis in the system. The objective of such replacements is to provide a new optimization space suitable for power flow analysis allowing to reduce the computational burden and reduce the likelihood of the curse of dimensionality in optimization problems in controlling the power distribution systems. That is, to avoid directly modeling large-scale power flow resulting in the curse of dimensionality problem for system optimization, some embodiments first partition the power distribution system into a set of feeder sections which are separated by normally-open or normally-closed switchable devices and then simplify the distribution system into a connected network by modeling feeder sections as its nodes and switches as links. The power flow model for the system is replaced with an internal power balance model to balance local generation and load for each section when isolated, and an external power balance model to coordinate power exchange with adjacent sections through switches when energized. A small-scale power flow calculation can be used to check if any power flow violation exists in any feeder section. If a violation is found, the switch power flow limits can be adjusted/reduced according to the sensitivity of violations with power injections at the switches to clear the violations. Each feeder section's energized status can be determined by the states of the switches residing on the paths between the section and available substations/feeders. In some implementations, the energy lost due to isolation for the section is determined based on local renewable generation, storage dispatch, and load demand.

To that end, some embodiments use a graph-based representation of the structure of a power distribution system. Each node of the graph is a section, e.g., a feeder section, of the power grid separated by switches from other sections of the power grid. The switches may be of different types, such as normally-closed or normally-open switches. Some example embodiments model a switch with a binary variable to represent its open/closed status, and a set of continuous variables to represent the amounts of currents/powers flowing through the switch. The variables may be subjected to a set of thresholds for maximal currents/powers allowed to flow through the switch. In some example embodiments, the thresholds may also be configurable to represent operational requirements.

Figure 3A:
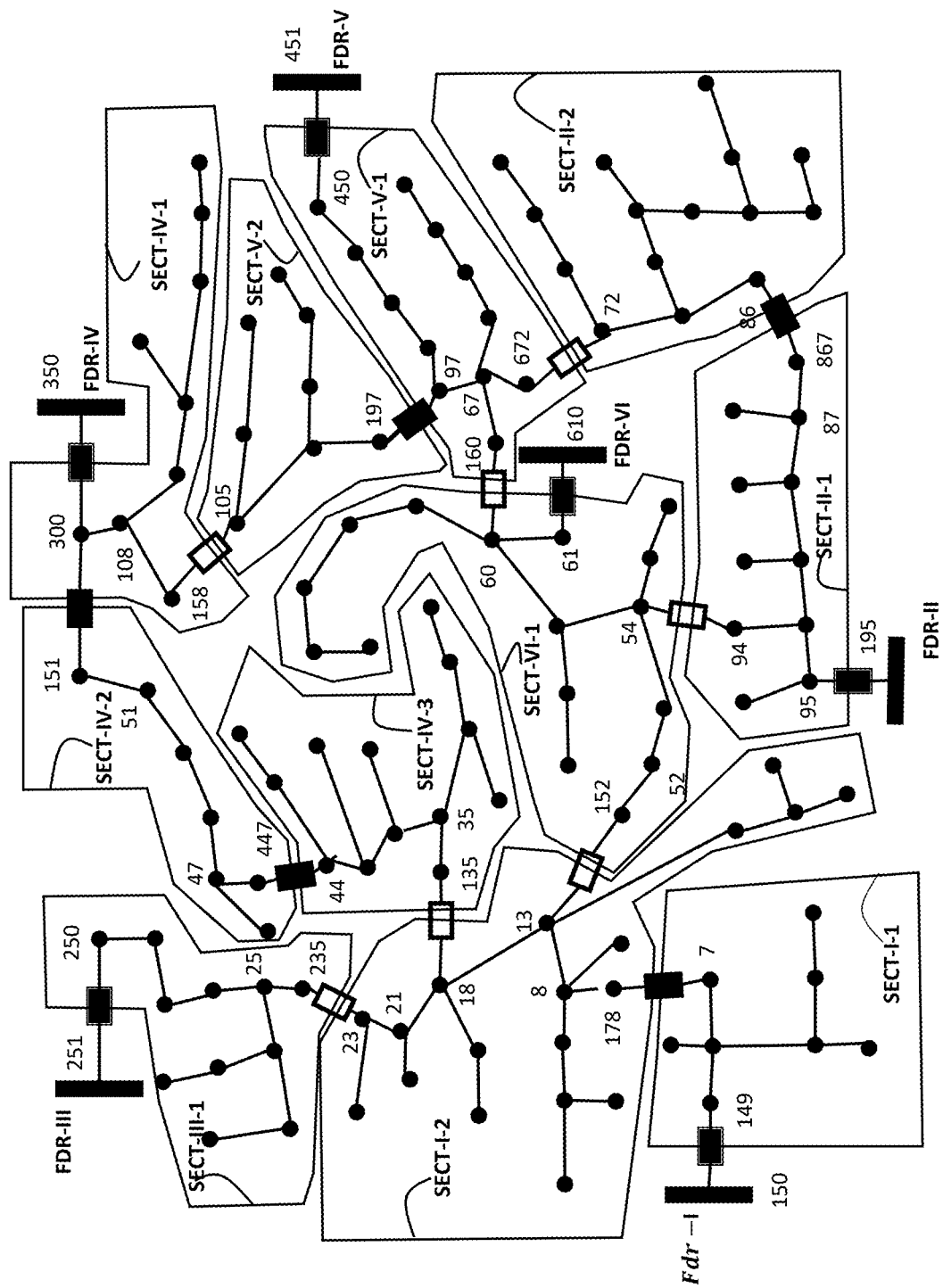
FIG. 3A is a schematic illustrating portioning a power distribution system into a set of feeder sections that can be used for feeder isolation and restoration control, according to some example embodiments.

FIG. 3A is a schematic illustrating partitioning a power distribution system into a set of feeder sections that can be used for feeder isolation and restoration control, according to some embodiments. A switch at open status (such as 13-152), and close status (such as 150-149) is represented by a unfilled rectangle, and filled rectangle respectively. A solid dot represents a bus, and a solid line between two buses represents a distribution line. A feeder head at a bus is represented as a vertical/horizontal filled rectangle. As shown in FIG. 3A, the system can be partitioned into a set of energized sections according to switch open/close statuses within the distribution system. For example, based on current switch statuses, feeder FDR-I has two energized sections, SECT-I-1 and SECT-I-2, and feeder FDR-III has only one energized section, SECT-III-1. If a section is isolated from the system due to faults or rotation requirements, the total loads within the section will be lost deducting the portion that can be satisfied by the local renewable generators and battery energy storage systems.

Figure 3B:
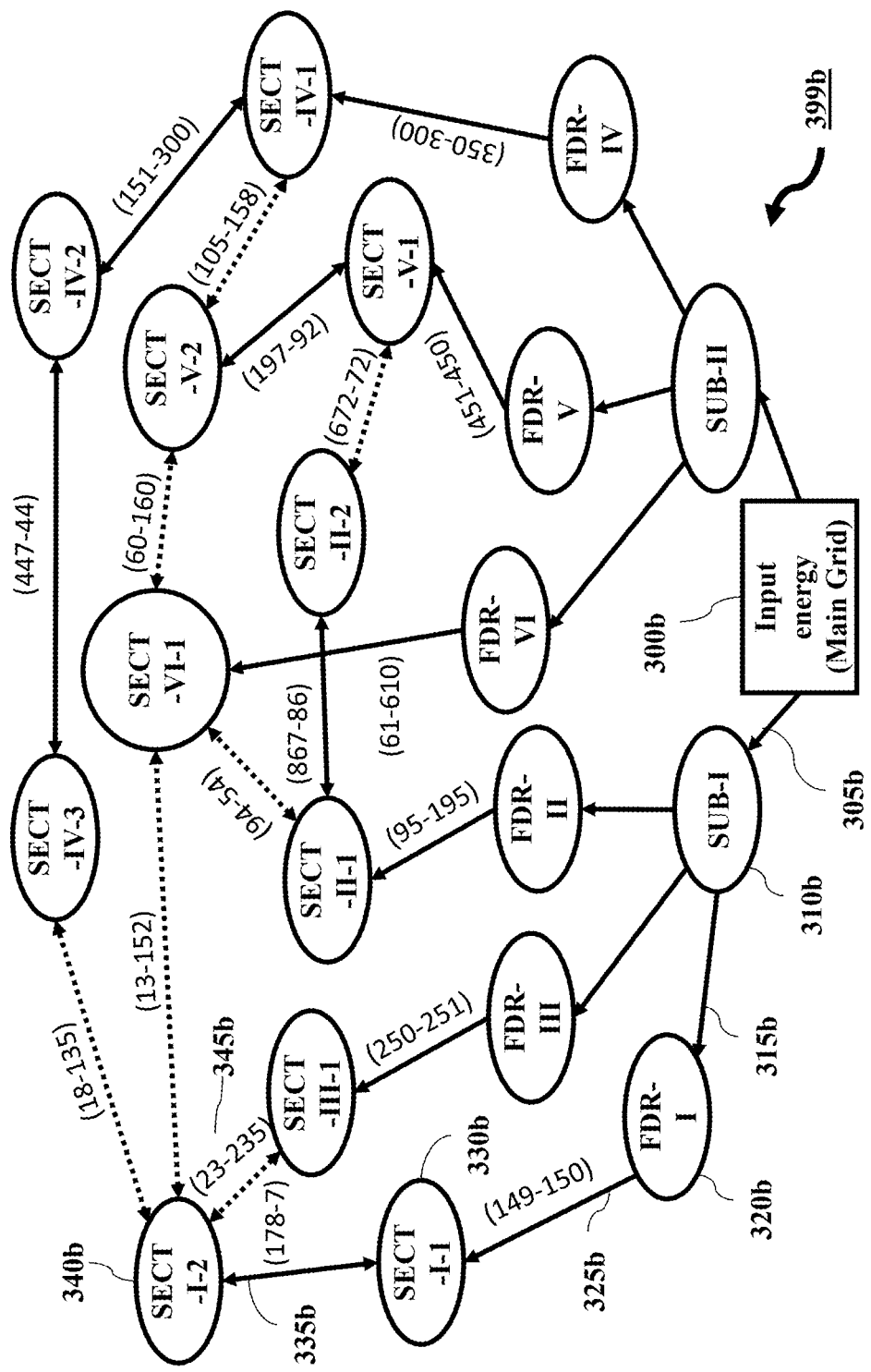
FIGS. 3B, 3C, and 3D are schematics of graph-based representations of the power distribution system according to some embodiments.

FIG. 3B is a schematic of a graph-based representation 399b of the structure of a power distribution system according to some embodiments. In the figure, the main grid 300b (similar to the main grid 201 of FIG. 2) is represented as a rectangle. A substation SUB-I 310b, feeder head 320b, or a feeder section is represented by an ellipse. A switch is represented as a solid line if closed (such as switch 178-7), or a dotted line if opened (such as 18-135).

The graph-based representation of the power distribution system is a radial tree of a plurality of nodes, such as nodes 310b, 320b, 330b, and 340b, connected by a plurality of edges, such as 305b, 315b, 325b, and 335b. Each node of the plurality of nodes represents a section of the power distribution system isolated by one or more switches from other parts of the power distribution system when one or more switches are at open positions. For example, node 330b can represent a section SECT-I-1 of FIG. 3A, while node 340b can represent a section SECT-I-2. Each of the plurality of nodes has a property of power demand of a corresponding section governed by a difference between energy demanded by loads of the corresponding section and energy available within the corresponding section from one or a combination of a local energy generator and local energy storage. For example, the section can include loads demanding the energy and power generator producing the energy. The difference between the local demand of the section and local production within the section becomes the property of the node representing the section.

Similarly, each edge of the plurality of edges connecting a node with a neighboring node represents a switch that connects a section represented by the node with a neighboring section represented by the neighboring node. For example, an edge 335b can represent a switch 178-7 of FIG. 3A connecting sections SECT-II-2 and SECT-II-1. The edge has a property constraining the throughput of energy through the switch in a direction of a power flow.

Notably, the graph-based representation 399b is a radial tree distribution of input energy 300b. A radial tree is a method of displaying a tree structure (e.g., a tree data structure) in a way that expands outwards, radially. To that end, the edges are directional and could be two-directions, like an edge 345b forming a loop if closed, or single-directional, like an edge 305b, or 315b.

The switches connect the power flow between each feeder section and other sections of the power distribution system. Hence, the switches are represented as edges connecting nodes of the graph-based representation. While the property of a node is its power demand (fixed or varying over time), the property of an edge is its potential throughput of supplying the power through the switch. In some example embodiments, the graph is a radial tree starting from a root node that represents the source of powering the distribution system, such as the main grid 300b. Hence, the throughput of a switch connecting a node to its child is the minimum of the throughput of the switch defined by its type and the throughput of the edges leading to the node defining the maximum flow of the energy the switch can receive. Notably, the edges are directional, and a pair of nodes can be connected by edges in one or both directions with different throughputs.

It should be noted, that given this graph-based representation, the state of the entire power distribution system can be represented as a function of the states of the switches that pass or block the flow of the energy. Hence, the effect of the internal complexities of different elements of the power distribution system such as individual demand of different loads, power storage, power generation, type, and cost of the production of the power can be reduced (or aggregated) or just ignored by the optimization.

Additionally, this graph-based representation is advantageous for disaster-induced generation deficiency that can be reflected in the properties of the nodes and the edges. Since the graph is a radial tree that expands outwards, i.e., radially from a root node, each node is connected to the root node through one or multiple radial paths. If at least one edge on a radial path leading to the node is removed or opened, the entire path is broken. The edge removal can be intentional or unintentional, i.e., controlled or uncontrolled. The unintentional removal can be caused by a natural disaster and/or unplanned event. The intentional removal can be caused by optimization of the power distribution in case of energy deficiency. This intentional removal can be implemented by opening the switch.

Hence, the configuration of the radial tree can be changed in case of natural disasters and/or unplanned events. However, if the edge on the tree is present, the edge is considered to be able for passing energy given its throughput which can also be changed by the natural event and/or as the result of the optimization. Whether the switch should or should not pass the energy is governed by the state of the switch and the corresponding state of the edge.

Figure 3C:
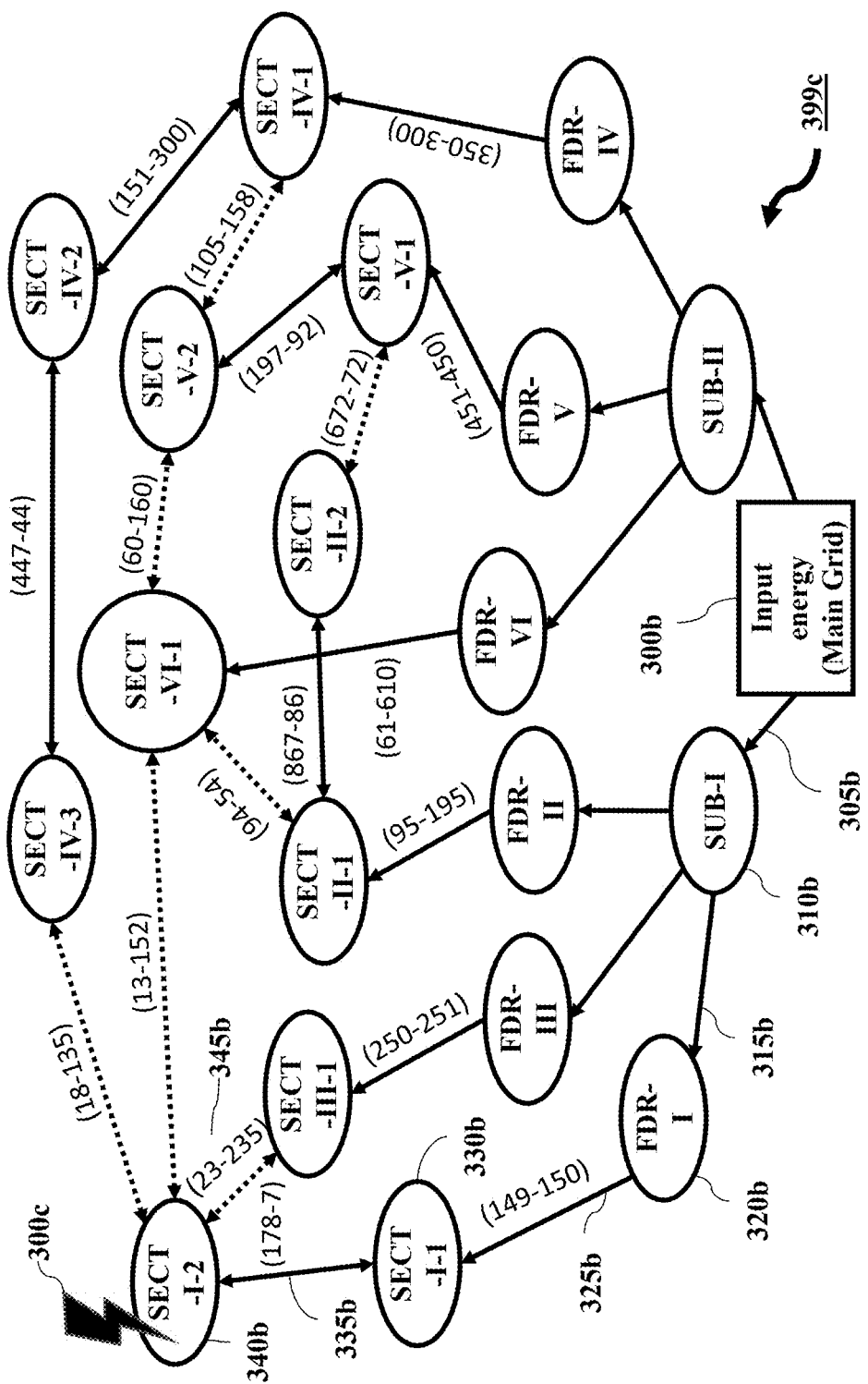

FIG. 3C is an exemplar schematic of a graph-based representation 399c of the structure of a power distribution system affected by an exemplar adversarial event 300c according to some embodiments. In this case, some conductors of distribution lines of the feeder section represented by node 340b are broken, so node 340b is removed from the representation. Other examples include changing the properties of the nodes due to damage to local energy generators like storage of power mills, etc.

As illustrated by the principles of FIG. 3C, in some embodiments the control system stores a nominal graph-based representation of the power distribution system and updates the nominal graph-based representation of the power distribution system based on a type of adversarial event to collect the graph-based representation of the power distribution system. For example, the nominal graph-based representation of the power distribution system can be a graph of FIG. 3B, while the graph-based representation of FIG. 3C is the updated graph caused by the situation where the energy available to the power distribution system is less than a demanded energy due to an adversarial event.

Figure 3D:
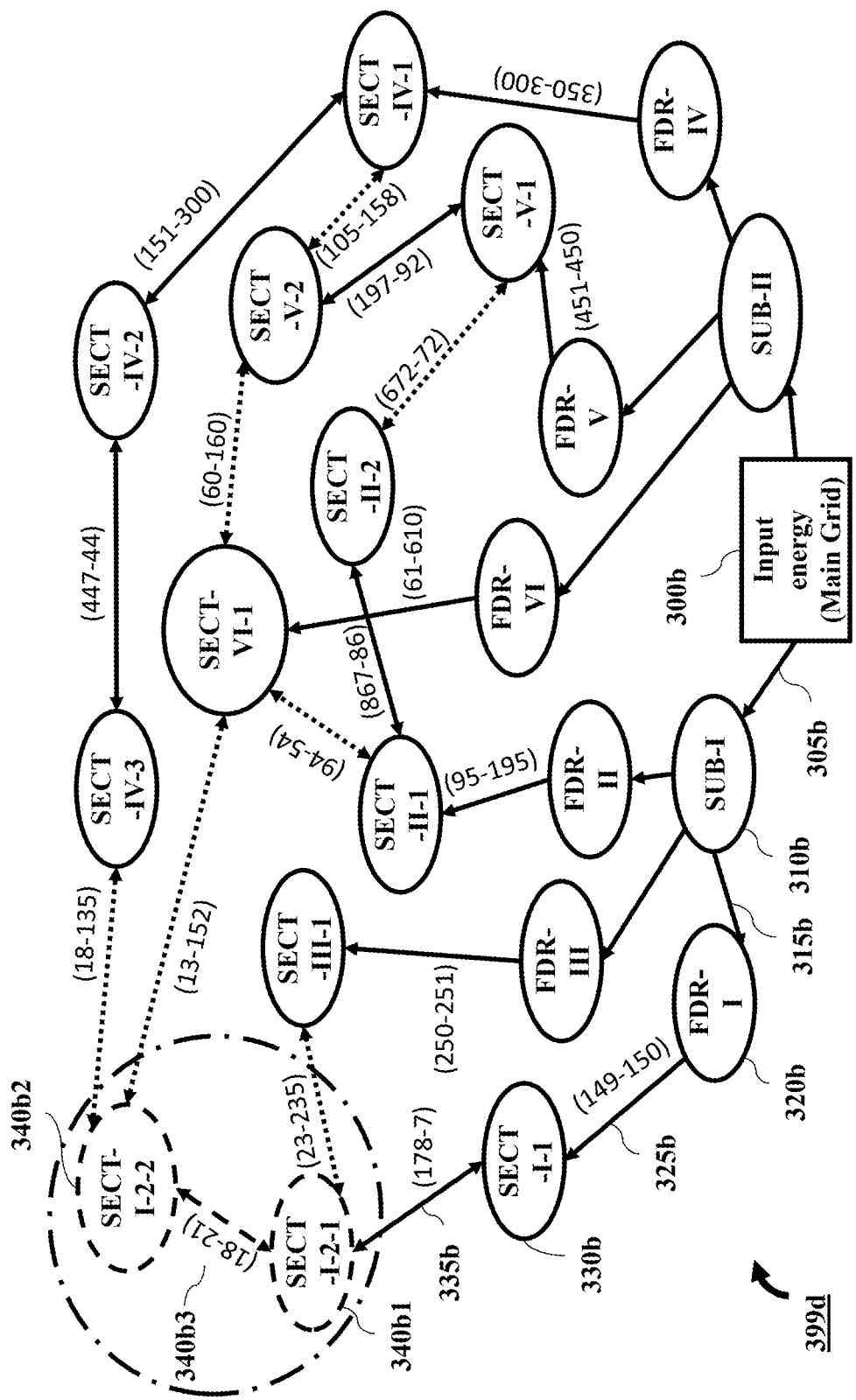

FIG. 3D is an exemplar schematic of a graph-based representation 399d of the structure of a power distribution system according to some embodiments. This example illustrates graph-based representation for potential distribution system structure to be determined for reducing a specific cost function, or meet some specific constraints. In the figure, a normally-closed switch between 18-21, 340b3 will be determined to be installed for splitting the original feeder section SECT-I-2 into two sections, SECT-I-2-1, 340b1 and SECT-I-2-2, 340b2 for reducing maximum section energy lost. Various operational and planning measures of distribution systems can be determined using graph-based representation through specifying properties, states, and/or constraints of the nodes and edgers.

For example, in some embodiments, the constraint defined by the graph-based representation includes one or a combination of a potential of the power exchange between the nodes, a constraint on the direction of the power flow of each edge, a constraint on a throughput of the power flow at each edge, a power balance between power flowing into and out of each non-isolated node, and a radial constraint on a radial path formed by multiple edges. Additionally or alternatively, the property of the edge, constraints throughput of the energy through the switch in the direction of the power flow to be not greater than throughput of the switch defined by its type and a state of a parent edge connecting the node with a parent node, wherein a state of each node defines amount of power flowing through a corresponding switch.

As such, the graph-based representation of a power distribution system according to some embodiments allows the formulation of the optimization problem using the following principles: optimize a cost function of properties of nodes as a function of the states of edges given the radial tree of the graph defining relationships and properties of the nodes and the edges as a constraint. Notably, the graph-based representation of the meta-structure of the grid is differentiable allowing for various optimization techniques.

Figure 3E:
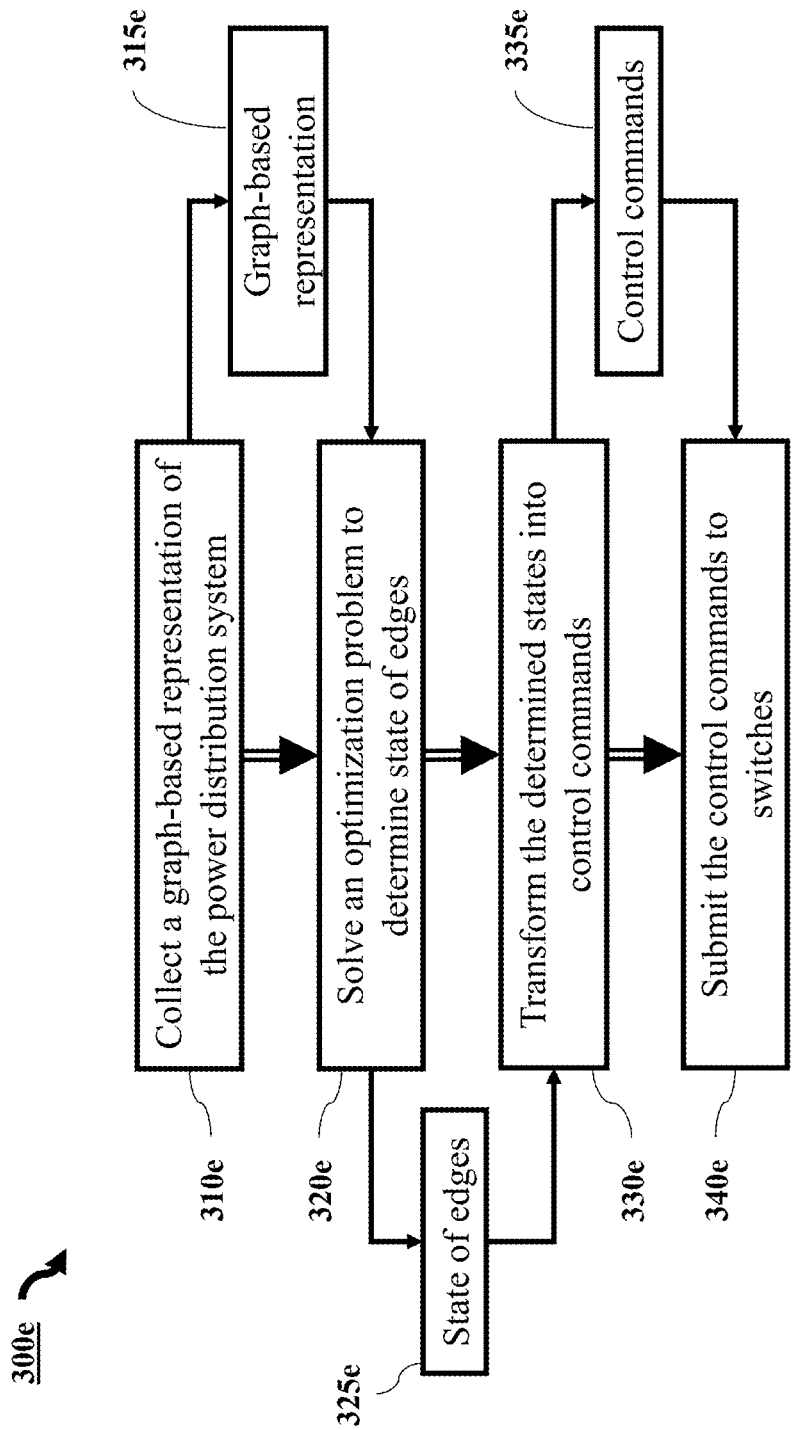
FIG. 3E is a block diagram of a method for controlling power flow of available energy in a power distribution system according to some embodiments.

FIG. 3E shows a block diagram of a method 300e executed by a control system for controlling a power flow of available energy in a power distribution system according to some embodiments. The control system includes a processor; and a memory having instructions stored thereon that, when executed by the processor, cause the control system to perform the steps of the method 300e.

The method 300e collects 310e a graph-based representation 315e of the power distribution system as a radial tree of a plurality of nodes connected by a plurality of edges. As described in relation to FIGS. 3B-3D, each node of the plurality of nodes represents a section of the power distribution system isolated by one or more switches from other parts of the power distribution system when one or more switches are at open positions. Each edge of the plurality of edges connecting a node with a neighboring node represents a switch that connects a section represented by the node with a neighboring section represented by the neighboring node, wherein each of the plurality of nodes has a property of power demand of a corresponding section governed by a difference between energy demanded by loads of the corresponding section and energy available within the corresponding section from one or a combination of a local energy generator and a local energy storage, wherein the edge has a property constraining throughput of energy through the switch in a direction of a power flow.

The method 300e solves 320e an optimization problem to determine a state 325e of each of the plurality of edges of the graph-based representation 315e governing the power flow of the available energy optimizing a cost function of the properties of the plurality of nodes given the graph-based representation of the power distribution system as a constraint. The constraint may include the connectivity relation between nodes and edges, and technical operational models and limits relevant to nodes and edges.

Next, the method 300e transforms 330e the determined state 325e of each of the plurality of edges into control commands 335e for states of at least some switches of the power distribution system, and submit 340e the control commands 335e to the at least some switches of the power distribution system to cause a change in the power flow of the available energy.

The optimized states of the edges can be transformed into the control commands based on the states of the edges and the current states of the switches. For example, if the state of the switches is always open, and the control command is also "open the switch" such a control command may or may not be transmitted. However, if the state of the switches is always open, and the control command is "close the switch" such a control command is transmitted.

Alternatively, the method 300e solves 320e an optimization problem to determine a combination of a state 325e of each of the plurality of edges, and properties of each of plurality of nodes of the graph-based representation 315e governing the power flow of the available energy optimizing a cost function of the states of the plurality of edges and the properties of the plurality of nodes given the graph-based representation of the power distribution system as a constraint. Then, the method 300e transforms 330e the determined state 325e of each of the plurality of edges, and properties of each of the plurality of nodes into control commands 335e for states of at least some switches, and properties of at least some nodes of the power distribution system, and submit 340e the control commands 335e to the at least some switches and some nodes of the power distribution system to cause a change in the power flow of the available energy.

Different embodiments use different methods for optimizing the state of the edges of the graph. For example, to take into account various interests and enable fair blackout rotation, some embodiments model the blackout rotation as a multi-objective optimization problem to balance one or a combination of objectives including minimization of lost energy and minimization of switch operations to represent the power grid's needs, minimization section outage duration, and minimization of section outage frequency to represent customers' requirements, and minimization of outage frequency differences among feeder sections, and minimization of outage frequency differences among feeder sections to achieve fair blackout rotation goals.

Exemplary Embodiment: Fair Blackout Rotation Under Given System Configuration

Problem Formulation

The disclosed method is designed to achieve a fair blackout rotation among different sections of the system while maximally maintain system balance, and evenly share the power shortage impacts among customers. The method utilizes both graph topology analysis and mixed-integer linear programming to determine the blackout rotation scheme.

The system is first partitioned into a set of feeder sections by opening all switches and each all-connected area forms as a feeder section. Then modeling each section as a node, and each switch as link, a connected network is generated to represent the topology structure of the distribution system, and corresponding connectivity relationship between sections, feeders and substations can be established through analysis of the connectivity of the network. As shown in FIG. 2, or FIG. 3B, the distribution can be regarded a configurable tree, the main grid is the root, first-tier fictitious links connect the main grid to the substations, and second-tier actual/fictitious links connect the substations to the feeders, and each feeder forms as a branch of the tree. Through switch operations, the tree branches can be cut off or reconfigured while remaining radial tree's configuration.

For a given configuration scenario, six different objectives for blackout rotation optimization can be considered to model diverse needs from the distribution system, the customers and the social fairness requirement, including (1). minimizing the total amount of lost energy, $f_c^{out\_mwh}$;
(2). minimizing the total number/frequency of switching operations, $f_c^{sw\_fq}$;
(3). minimizing the maximum outage hours, $f_c^{out\_hr}$;
(4). minimizing the maximum outage frequency/times, $f_c^{out\_fq}$;
(5). minimizing the maximum difference of outage hours between any two feeder sections, $f_c^{diff\_out\_mwh}$; and
(6). minimizing the maximum difference of outage frequencies between two feeder sections, $f_c^{diff\_out\_mwh}$;

$$f_c^{out\_mwh} = \sum s \in ss \left( f_{s,0,c}^{out\_mwh} + \sum t \in T_c x_{s,t,c}^{isolated} p_{s,t,c}^{net} \Delta T_{t,c} \right) \quad (1)$$

$$f_c^{sw\_fq} = f_{0,c}^{sw\_fq} + \sum sw \in sw \sum t \in T_c \left| x_{sw,t,c}^{closed} - x_{sw,t-1,c}^{closed} \right| \quad (2)$$

$$f_c^{out\_hr} = \max_{s \in SS} \left( f_{s,0,c}^{out\_hr} + \sum t \in T_c x_{s,t,c}^{isolated} \Delta T_{t,c} \right) \quad (3)$$

$$f_c^{out\_fq} = \max_{s \in SS} \left( f_{s,0,c}^{out\_fq} + \sum t \in T_c x_{s,t,c}^{out} \right) \quad (4)$$

$$f_c^{diff\_ou\_hr} = \max_{\substack{s1,s2 \in SS \\ s1 \neq s2}} \left| f_{s1,0,c}^{out\_hr} - f_{s2,0,c}^{out\_hr} + \sum_{t \in T_c} \left( x_{s1,t,c}^{isolated} - x_{s2,t,c}^{isolated} \right) \Delta T_{t,c} \right| \quad (5)$$

$$f_c^{diff\_out\_fq} = \max_{\substack{s1,s2 \in SS \\ s1 \neq s2}} \left| f_{s1,0,c}^{out\_fq} - f_{s2,0,c}^{out\_fq} + \sum t \in T_c x_{s1,t,c}^{out} - \sum t \in T_c x_{s2,t,c}^{out} \right| \quad (6)$$

where c is the power shoratge scenario index, $T_c$ is the set of time periods of shoratge scenario c, $\Delta T_{t,c}$ is the duration for period t of shoratge scenario c. SS is the set of feeder sections within the system. $f_{s,0,c}^{out\_mwh}$, $f_{0,c}^{sw\_fq}$, $f_{s,0,c}^{out\_hr}$ and $f_{s,0,c}^{out\_fq}$ are the accumulated lost energy for section s, the accumulated number of switch operations for the system, the accumulated outage hours and times for section s at time t=0, under scenario c, respectively. $x_{s,t,c}^{isolated}$ is a binary variable indicting the isolated state for feeder section s at period t of scenario c, 1 indicated isolated, and 0 indicated energized. $P_{s,t,c}^{NET}$ is the net load of section s at time period t of scenario c, and defined as:

$$p_{s,t,c}^{net} = \Sigma_{ld \in LD_s} P_{ld,t,c}^D - \Sigma_{sl \in SL_s} P_{sl,t,c}^G - \Sigma_{wd \in WD_s} P_{wd,t,c}^G + \Sigma_{es \in ES_s} (p_{es,t,c}^{CH} - p_{es,t,c}^{DCH}). \quad (7)$$

$LD_s$, $SL_s$, $WD_s$ and $ES_s$ are the sets of loads, solar plants, wind plants and battery energy storages within section s. $P_{ld,t,c}^D$, $P_{sl,t,c}^G$, $P_{wd,t,c}^G$ $p_{es,t,c}^{DCH}$, and $p_{es,t,c}^{CH}$ are load demand, solar power generation, wind power generation, storage discharging and charging powers of load ld, solar plant sl, wind plant wd and stoarge es at period t of scenario c, respectively. $x_{s,t,c}^{out}$ is a binary variable indicating if a new outage occurred at feeder section s at period t of scenario c, and defined as:

$$x_{s,t,c}^{out} = \max\{x_{s,t,c}^{isolated} - x_{s,t-1,c}^{isolated}, 0\} \quad (8)$$

SW is the set of switches within the system. $x_{sw,t,c}^{closed}$ is a binary variable indicting the closed state for switch sw at period t of scenario c, 1 indicated closed, and 0 indicated open. The initial status is set as $x_{sw,0,c}^{closed}=0$ for normally open switch, and $x_{sw,0,c}^{closed}=1$ for normally closed switch.

It is noted that $T_c$ is the time horizon for the power shortage event if the rotation is implemented without adapting to blackout evolving, i.e. a static rotation scheduling method is adopted, but the rolling scheduling horizon if a rolling rotation scheduling approach is used. For a rolling rotation approach, the pre-existing condition such as previous outage hours and times for each feeder section before the new rolling scheduling horizon is started, are included when evaluating each objective function. The static method will be used if a accurate projection for the power shortage evolving process can be obtained, otherwise the rolling horizon method will be used and the existing conditions will be considerted when triggering a new solution.

The isolated status of the feeder section is determined by the energized statuses for all paths between sources (i.e. feeder heads) and the feeder section. One of paths is energized, then the section is energied. The section is isolated only if all paths are not energized.

$$x_{s,t,c}^{isolated} = 1 - \vee_{p \in PT_s^{SRC}} x_{p,t,c}^{energized} \quad (9)$$

wherein $PT_s^{SRC}$ is the set of paths between section s and all sources (i.e. feeder heads), $x_{p,t,c}^{energized}$ is a binary variable indicating the energized status of path p at period t of scenario c, 1 indicated energized, and 0 not energized. The initial status is set as $x_{s,0,c}^{isolated}=0$, if the disaster occurs after a normal status for the section s.

The energized status of a path between a feeder section and a source depends on the closed statuses of all swicthes resided on the path. Any switch is at open status, the path is not energized. Only all swicthes are energized, then the path is enegized.

$$x_{p,t,c}^{energized} = \wedge_{sw \in SW_p^{SRC}} x_{sw,t,c}^{closed} \quad (10)$$

$SW_p^{SRC}$ is the set of swicthes residing on path p.

The blackout rotation is subject to technical constraints required by device characterstics, power flow, system radial operation, and power shortage conditions.

It is assumed that the predictions of load demands, solar and wind generations are available and can be treated as fixed values. Only the discharging and charging powers of battery storages are to be determined. The operational characterstics of the storage can be modeled using the following equations:

$$SOC_{es,t,c} = (1 - \varepsilon_{es})SOC_{es,t-1,c} + \eta_{es}^{CH} \frac{p_{es,t,c}^{CH} \Delta T_{t,c}}{E_{es}} - \frac{p_{es,t,c}^{DCH} \Delta T_{t,c}}{\eta_{es}^{DCH} E_{es}}, \quad (11)$$

-continued $\forall\, es \in ES, \forall\, T \in T_c$ $$x_{es,t,c}^{CH} + x_{es,t,c}^{DCH} \le 1,\, , \forall\, es \in ES, \forall\, t \in T_c \quad (12)$$

$$x_{es,t,c}^{CH} = \{0, 1\}, \forall\, es \in ES, \forall\, t \in T_c \quad (13)$$

$$x_{es,t,c}^{DCH} = \{0, 1\}, \forall\, es \in ES, \forall\, t \in T_c \quad (14)$$

$$0 \le p_{es,t,c}^{CH} \le x_{es,t,c}^{CH} \overline{P}_{es}^{CH}, \forall\, es \in ES, \forall\, t \in T_c \quad (15)$$

$$0 \le p_{es,t,c}^{DCH} \le x_{es,t,c}^{DCH} \overline{P}_{es}^{DCH}, \forall\, es \in ES, \forall\, t \in T_c \quad (16)$$

where $SOC_{es,t,c}$ is the state of charge for stoarge es at period t of shoratge scenario c. $x_{es,t,c}^{CH}$ and $x_{es,t,c}^{DCH}$ are binary variables to indiccate storage es is charging or discharging at period t of shoratge scenario c. $\varepsilon_{es}$, $\eta_{es}^{CH}$, $\eta_{es}^{DCH}$ are the self-consumption coefficiency, charging efficiency and dicharging efficiency for storage es. $\overline{P}_{es}^{CH}$, $\overline{P}_{es}^{DCH}$ and $E_{es}$ are the maximum charging power, maximum dischaging power and maxium energy for storage es. Equation (11) decsribes the energy balance of the storgae.

The power shortage for power grid is described by the upper and lower generation bounds for each substation under the given scenario along the shortage horizon.

$$\underline{P}_{sub,t,c}^{G} \le p_{sub,t,c}^{G} \le \overline{P}_{sub,t,c}^{G} \quad (17)$$

$p_{sub,t,c}^{G}$ is the power supplied by substaion sub at time period t of scenario c. $\overline{P}_{sub,t,c}^{G}$ and $\underline{P}_{sub,t,c}^{G}$ are upper and lower boundary envelopes to describe ranges of substation supplied powers.

The distribution system can only be operated as radial, not meshed or looped. Therefore, for any path between any two of feeder heads, the radial operation contraint must be applied, that is at least one of switches along the path between two feeder heads must be at open state:

$$\sum_{sw \in SW_{fdr1 \leftrightarrow frd2,p}^{FDR}} x_{sw,t,c}^{closed} \le \left(\sum_{sw \in SW_{fdr1 \leftrightarrow frd2,p}^{FDR}} 1\right) - 1, \quad (18)$$

$\forall\, fdr1, fdr2 \in FDR, fdr1 \ne fdr2$ $SW_{fdr1 \leftrightarrow fdr2,p}^{FDR}$ is the set of swicthes residing on path p between feeder heads of feeders fdr1 anad fdr2. FDR is the set of feeders within the distribution system.

Power balance or power flow constraints are required for both the substations and feeder sections. For any substation, the power supplied from main grid matches the sum of power entered into the distribution system through feeders:

$$p_{sub,t,c}^{G} = \Sigma_{fdr \in FDR_{Sub}} \Sigma_{sw \in SW_{fdr}^{CB}} (f_{sw,t,c}^{+} - f_{sw,t,c}^{-}) \quad (19)$$

where $FDR_{sub}$ is the set of feeders connected with substation sub, $SW_{fdr}^{CB}$ is the set of circuit breakers located at feeder head of feeder fdr. $f_{sw,t,c}^{+}$ and $f_{sw,t,c}^{-}$ are bi-directional power flows on switch sw at time period t of scenario c, and postive direction indicates power entering the feeder, and negative indicates power leaving the feeder.

For feeder section, the power balance is activated only when the section is energized.

$$(1 - x_{s,t,c}^{isolated}) p_{s,t,c}^{net} + \Sigma_{sw \in SW_S}(f_{sw,t,c}^{+} - f_{sw,t,c}^{-}) \quad (20)$$

The postive-direction power flow $f_{sw,t,c}^{+}$ indicates power entering the section, and negative $f_{sw,t,c}^{-}$ indicates power leaving the feeder.

The power flows of the swicthes are also limited by their maximum capacities as:

$$f_{sw,t,c}^{+} \le x_{sw,t,c}^{closed} \overline{F}_{sw,c} \quad (21)$$

$$f_{sw,t,c}^{-} \le x_{sw,t,c}^{closed} \overline{F}_{sw,c} \quad (22)$$

$\overline{F}_{sw,c}$ is the mximum capacity of switch sw under shortage scenario c.

Figure 4A:
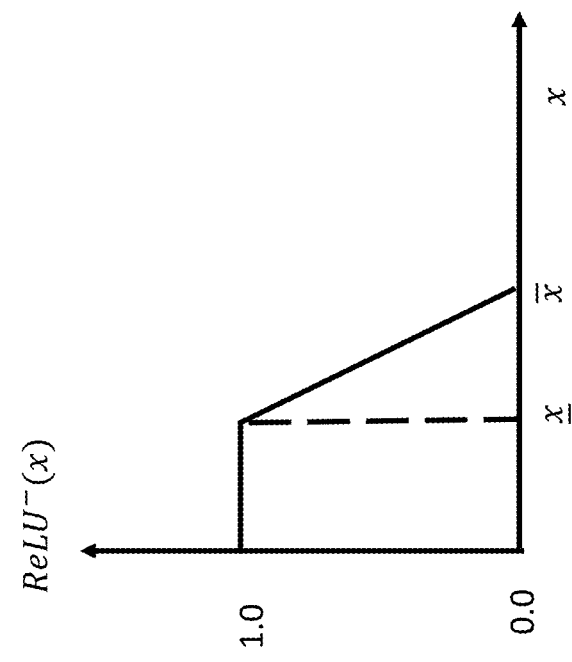
FIG. 4A is a schematic illustrating a positive-directional generalized ReLU function used to represent the objective satisfaction degree, according to some example embodiments.
Figure 4B:
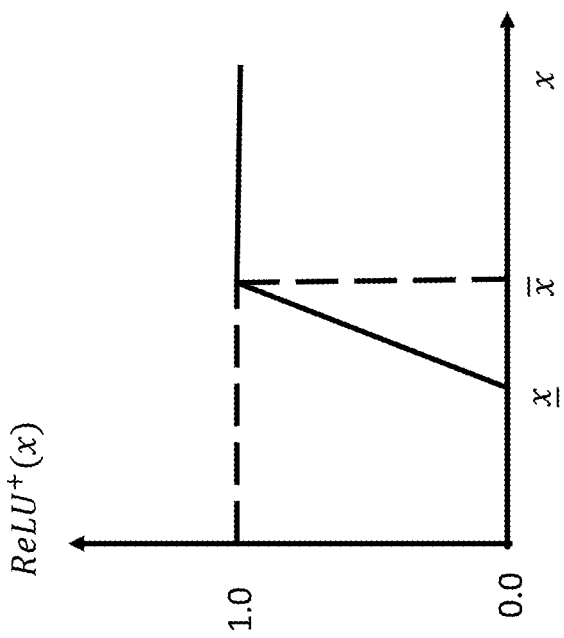
FIG. 4B is a schematic illustrating a negative-directional generalized ReLU function used to represent the objective satisfaction degree, according to some example embodiments.

The multiple objective optimization problem can be combined into single objective problem by using a satisfaction function to describe each objective's satisfied degree and defines a new objective to seek the maximum of the weighted sum of satified degrees or minmal satisfied degree, or combined. Usually the satisfacation function is a non-linear function, such as Sigmoid function. For computation simplification, the generalized rectified Linear activation functions (ReLUs) are used to describe the satisfaction degree of required objectives instead. The ReLU is generalizied with output capped at 1 with a configurable non-zero gradient as shown in FIG. 4A or FIG. 4B. Thus, FIG. 4A is a schematic illustrating a positive-directional generalized ReLU function used to represent the objective satisfaction degree, according to some example embodiments while FIG. 4B is a schematic illustrating a negative-directional generalized ReLU function used to represent the objective satisfaction degree, according to some example embodiments.

Although ReLU is nonlinear as well, the iterations for nonlinear solution can be avoided if processed properly. As shown in FIG. 4A, and FIG. 4B, the generalized ReLU can be divided into positive-directional generalized ReLU (ReLU$^+$) that the output is increased with the input, and negative-directional generalized ReLU(ReLU$^-$) that the output is decreased with the input. x is the variable for the input, and $\overline{x}$ and $\underline{x}$ represents its least tolerable value and most desirable value for a ReLU$^+$ function, and its most desirable value and least tolerable value for a ReLU$^-$ function.

The blackout rotation problem can be solved using the following objective and constraints:

$$\text{Max} \Sigma_{obj \in OBJ^-} \omega^{obj} \text{ReLU}^-(f_c^{obj}) + \lambda \quad (23)$$

$$\text{s.t. ReLU}^-(f_c^{out\_mwh}) \ge \omega^{out\_mgh} \lambda \quad (24)$$

$$\text{ReLU}^-(f_c^{sw\_fq}) \ge \omega^{sw\_fq} \lambda \quad (25)$$

$$\text{ReLU}^-(f_c^{out\_hr}) \ge \omega^{out\_hr} \lambda \quad (26)$$

$$\text{ReLU}^-(f_c^{out\_fq}) \ge \omega^{out\_fq} \lambda \quad (27)$$

$$\text{ReLU}^-(f_c^{diff\_out\_hr}) \ge \omega^{diff\_out\_hr} \lambda \quad (28)$$

$$\text{ReLU}^-(f_c^{diff\_out\_fq}) \ge \omega^{diff\_out\_fq} \lambda \quad (29)$$

Equations (7)-(21)

where OBJ$^-$ is the set of objectives that modeled using ReLu$^-$ functions, $\omega^{obj}$ is the weight factor for objectve obj.

Model Conversion and Solution

The above-formulated model is an non-linear optimization problems with mixed binary and continuous variables and logic operations. We propose a directed feasible region based method along with undirected feasible region method to convert the nonlinear optimization model into a mixed integer linear programming problem (MILP). This method converts nonlinear operations into linear ones, meanwhile it also avoids infeasible soutions such as when dealing with conflict or unreasonable objective tolerable ranges.

We first deal with ReLU functions using directed feasible range approach. Taken ReLU$^+$(x) as example, variable x has a tolerable lower limit $\underline{x}$, and a desirable upper limit $\overline{x}$, the output of this function can be replaced with a combination of three variables as:

$$\text{ReLU}^+(x) = y + y_1 - y_2 \quad (30)$$

y is a continuous variable, $y_1$ and $y_2$ are two non-negative variables. A directed feasible region defined by an auxiliary optimization problem can be embedded into the original blackout rotation problem to replace the ReLU function:

$$\text{maximize } y - y_1 - y_2 \quad (31)$$

Subject to:

$$y = x - x/\underline{x} - \underline{x} \quad (32)$$

$$y + y_1 \geq 0 \quad (33)$$

$$y - y_2 \leq 1 \quad (34)$$

$$y_1, y_2 \geq 0$$

The auxiliary objective will be embedded into the original problem to direct the optimization of variable x within the feasible region. Similarly, the above equations can be applied to $\text{ReLU}^-(x)$ except (32) is replaced with (35) defined as follows:

$$y = \frac{\overline{x} - x}{\overline{x} - \underline{x}} \quad (35)$$

The second type of issues to be dealt with by using directed feasible region approach are the absolute and max operations of binary or continuous variables, such as used in (2), and (3). The absolute function is defined as:

$$y = |x| \quad (36)$$

Its directed feasible range can be defined by using (37) as the objective, and (38)-(39) as constraints.

$$\max_{0 \leq y \leq 1} -Ny \quad (37)$$

$$\text{s.t. } y \geq x \quad (38)$$

$$y \geq -x \quad (39)$$

N is a small positive number and much smaller than any value for other variable defined in the objection function (23) or (100) for next section, such as 0.001. The max function is defined as:

$$y = \max_{1 \leq i \leq n} x_i \quad (40)$$

Its directed feasible range can be defined as constraint (41) with optimization directed by (37):

$$y \geq x_i, \forall 1 \leq i \leq n \quad (41)$$

The third type of issues to be dealt with by the directed feasible region approach are the logic operations of binary variable used by the feeder sections and switches, such as in (9) and (10).

Assumed $$y = \wedge_{i=1}^{n} x_i \quad (42)$$

where $x_i$ is a binary variable. The consecutive "and" operations can also be handled by a directed feasible region by taken (37) as objective and (43) and (44) as constraints.

$$y \leq x_i, \forall i = 1, 2, \ldots, n. \quad (43)$$

$$y \geq \Sigma_{i=1}^{n} x_i - n + 1, \forall i = 1, 2, \ldots, n. \quad (44)$$

Similarly, for a series of binary variables, $x_i$, its consecutive "or" operations can be replaced as a directed feasible region as well. Assumed $$y = \vee_{i=1}^{n} x_i \quad (45)$$

Its directed feasible range can be defined using (37) as auxiliary objective, and (46)-(47) as constraints.

$$y \geq x_i, \forall i = 1, 2, \ldots, n. \quad (46)$$

$$y \leq \Sigma_{i=1}^{n} x_i \quad (47)$$

Besides above functions and operations, we also have multiplication of two continuous variables, or one binary variable and one continuous variable in the formulated model, such as $x_{s,t,c}^{isolated} p_{s,t,c}^{net}$ used in (1). Those operations can be handled by using McCormick relaxation method to represent as linear function and constraints.

Figure 5:
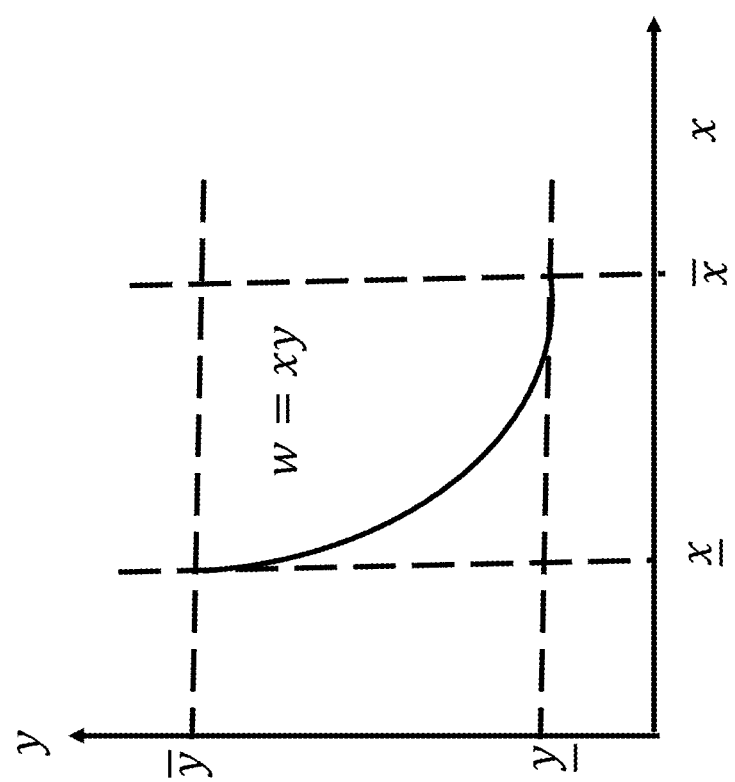
FIG. 5 is a schematic illustrating a graphical representation of McCormick relaxations for continuous variable multiplication, according to some example embodiments.

FIG. 5 is a graphical representation of McCormick relaxation method. Assumed there are two variables, x and y. Their product, w=xy has a feasible region defined using as:

$$w \geq \underline{x}y + x\underline{y} - \underline{x}\underline{y} \quad (48)$$

$$w \geq \overline{x}y + x\overline{y} - \overline{x}\overline{y} \quad (49)$$

$$w \leq \overline{x}y + x\underline{y} - \overline{x}\underline{y} \quad (50)$$

$$w \leq x\overline{y} + \underline{x}y - \underline{x}\overline{y} \quad (51)$$

Where $\overline{x}$ and $\underline{x}$, $\overline{y}$ and $\underline{y}$ are the upper and lower bounds of x and y, respectively. We can simply replace the product of two original variables, x and y using a new single variable, w and add those constraints (48)~(51) into the optimization problem.

By using above mentioned method, the blackout rotation problem can be converted into a MILP problem, and solved using commercial out-of-shelf software. After that, the obtained switch status settings and storage operations are converted into a set of implementable switching sequences by considering the switch characteristics, and detailed charging and discharging schedules for energy storage systems.

It is noted that if the projection for the power shortage event can be pretty accurate, the static horizon method is used, and we can determine the blackout rotation plan through a one-shot solution of above formulated model. Otherwise, blackout rotation plans may be determined by using a rolling horizon method, and each new solution is determined over a portion of entire power shortage horizon by considering the pre-existing conditions for the current horizon portion.

Exemplary Embodiment: Power Grid Enhancement for Fairer Blackout Rotation

For a power distribution system with fixed system configuration, its capability for achieving blackout rotations' fairness is limited due to the fixed setting of feeder sections, and fixed placement of storages. A fairer blackout rotation can be achieved through embedding the blackout rotations consideration into the system resilience enhancement processing. The enhancement measures consider in this disclosure includes additions of sectionalizing switches (i.e. normally-closed switches), tie switches (i.e. normally-open switches), and battery energy storage systems (BESS s).

It is assumed that installed locations and ratings for each candidate switch and storage are known, and the goal for the distribution system is determining the best cost-effective combinations of switches and storages to satisfy diverse requirements from the system and customer satisfaction subject to technical and financial constraints arising from normal operations, network failures, power supply shortages, black starts, and financial feasibility.

To achieve this objective, some embodiments include adding extra switches in the normally closed, or open state. Doing in such a manner changes the configuration of the graph-based representation of the power grid and adds flexibility to the optimization. As a result, in some embodiments, the power distribution system includes a radial path with at least two switches in the normally closed state connected on the radial path directly enabled splitting the radial path into smaller sections and at least one switch in the normal open state enabled rerouting the radial path to alternative power supply. Notably, having at least two switches in a row in the normally closed state makes sense only due to the principles employed by the embodiments. Additionally or alternatively, some embodiments optimize the location of the extra switches to improve the flexibility of the optimization.

Figure 6:
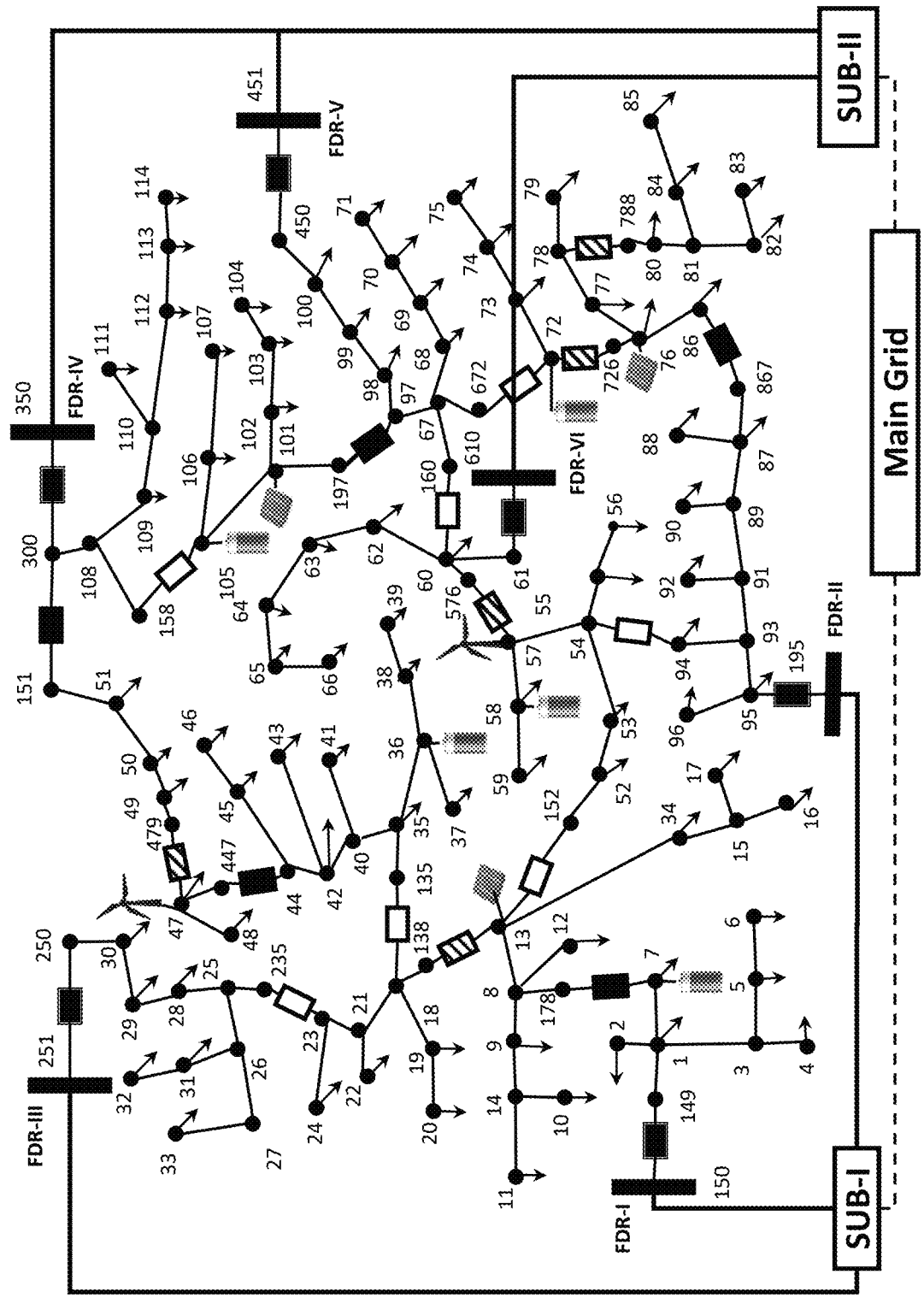
FIG. 6 is a schematic illustrating a sample distribution system modified from IEEE 123-node feeder with candidate switches and storages, according to some example embodiments.

FIG. 6 is a schematic illustrating a sample distribution system modified from IEEE 123-node feeder with candidate switches and storages, according to some example embodiments. This example has five candidate storages to be planned to add at nodes 7,36,58,72,105 with capacities 500 kWh/50 kW per phase. In addition, there also 4 sectionalizing switches planned to add into the system on branches 13-138,57-576,72-726,78-788 and 47-479.

Figure 7:
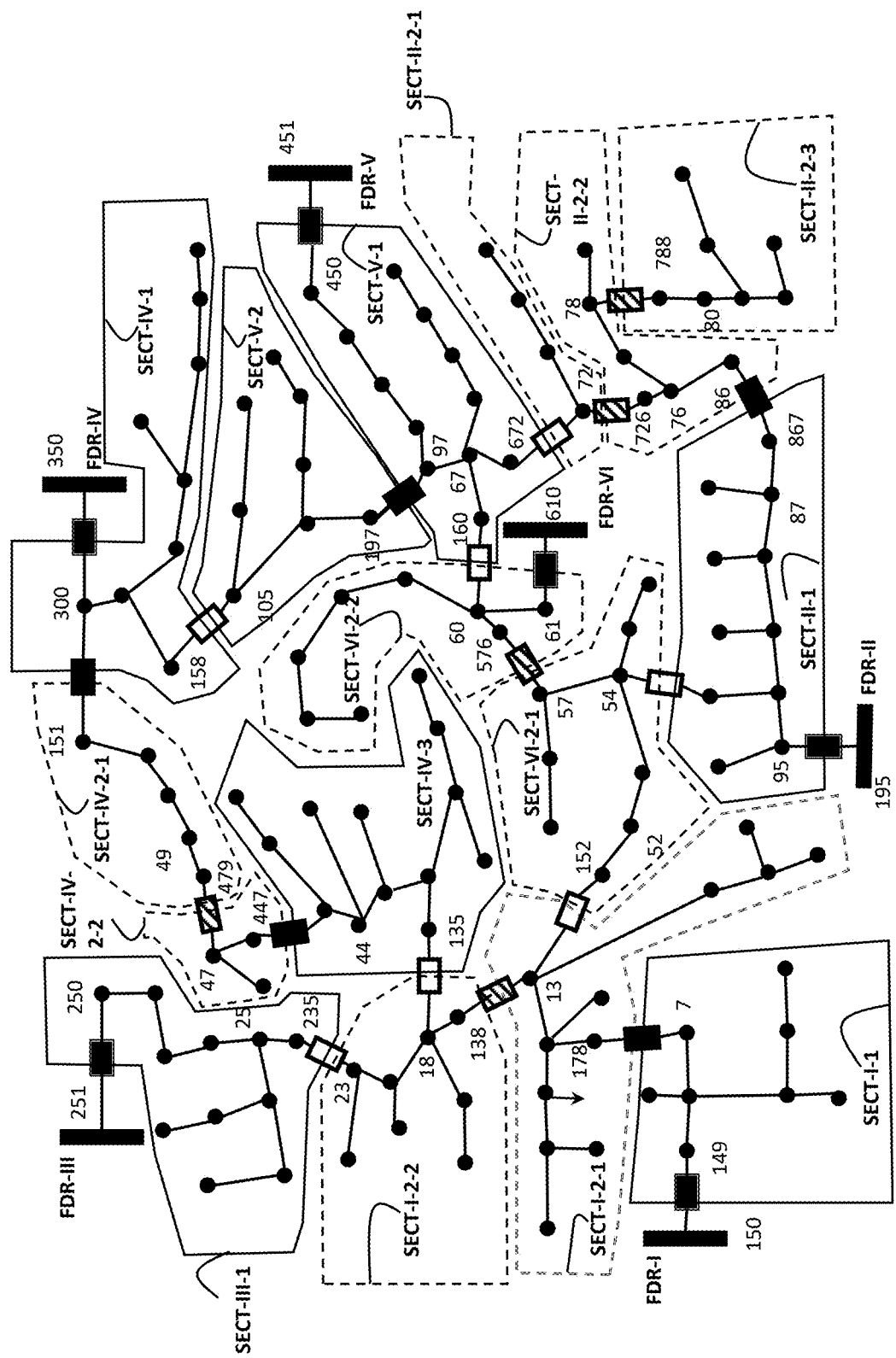
FIG. 7 is a schematic illustrating the partitioned fixed and flexible boundary sections for the sample distribution system of FIG. 6, according to some example embodiments.

FIG. 7 is a schematic illustrating the partitioned fixed and flexible boundary sections for the sample distribution system given in FIG. 6, according to some example embodiments. A fixed boundary section refers to a feeder section that all switches located at its boundary are existing installed switches, such as SECT-II-1. In contradiction, a flexible boundary section refers to section bounded with at least one switch that its installment status is to be determined, such as SECT-I-2-1, and SECT-I-2-2. Therefore, if the installment status for the switch of flexible boundary section is not installed, then this section will be merged with adjacent flexible boundary section(s) as a whole to be used for isolation and restoration. For example, if switch on 18-138 are determined to be not installed, then flexible boundary sections SECT-I-2-1, and SECT-I-2-2 will be merged together as a minimal isolation section. Otherwise, it can be considered an independent section to be isolated or restored.

There are six objectives are used to represent the essential needs and related costs for adding new switches and storages, including (1) minimizing the annualized cost for all devices to be installed in the system, $f^{annual\_cost}$; (2). minimizing the maximum connected net loads for flexible boundary sections, $f^{sect\_mw}$; (3) minimizing the average N−1 contingency duration for flexible boundary sections, $f^{sect\_n1hr}$; (4). maximizing the total tie pickup capacities for tie switches to be installed, $f^{tie\_cap}$; (5). maximizing the reserved energy of storages, $f^{soc\_resrv}$; and (6). maximizing the power discharged from the storages, $f^{blkst\_dch\_mwh}$.

We also use a set of operation related objectives to evaluate the behaviors and capability for added switches and storages under different operational scenarios. Those added objectives include one objective for normal operational cost, and a set of objectives for rolling blackout scenarios. Therefore, besides above described 6 objectives, we also have the following additional objectives to further regulate the switch and storage additions, including (7) minimizing the operational cost under normal operations, $f^{norm\_oper\_cost}$; (8) minimizing the total expected amount of lost energy, $f^{roll\_out\_mwh}$; (9). minimizing the total expected number/frequency of switching operations, $f^{roll\_sw\_fq}$; (1.0) Minimizing the expected maximum outage hours, $f^{roll\_out\_hr}$; (11) minimizing the expected maximum outage frequency/times, $f^{roll\_out\_fq}$; (12). minimizing the expected maximum difference of outage hours between any two feeder sections, $f^{roll\_diff\_out\_hr}$; and (13) minimizing the expected maximum difference of outage frequencies between two feeder sections, $f^{roll\_diff\_out\_fq}$.

The annualized cost objective is defined as:

$$f^{annual\_cost} = \sum\nolimits_{i \in SW^{NEW}} AC_i^{SW} x_i^{SW-inst} + \sum\nolimits_{i \in ES^{NEW}} AC_i^{ES} x_i^{ES-inst}$$

Where, $SW^{NEW}=\{SW^{NO-NEW}, SW^{NC-NEW}\}$ is the set of candidate switches, $SW^{NO-NEW}$, and $SW^{NC-NEW}$ are the sets of candidate normally-open tie switches, and normally-closed sectionizing switches. $ES^{NEW}$ is the set of candidate battery energy storage systems. To simplify presentation, let $DEV=\{SW, ES\}$. $x_i^{DEV-inst}$ is a binary variable indicating the installation status for device i, 1 if the device i is installed, otherwise 0. If an normally-open switch (i.e. tie switch) is not installed, it will be treated as an open link when determining system's connectivity. In contraction, an normally-closed switch (i.e. sectionalizing switch) will be treated a closed link if not installed. $AC_i^{DEV}$ is the annualized cost for device i, and defined as:

$$AC_i^{DEV}=AU_i^{DEV}(CI_i^{DEV}+IC_i^{DEV})+MC_i^{DEV}, \quad (53)$$

where, $CI_i^{DEV}$, $IC_i^{DEV}$ and $MC_i^{DEV}$ are the investment cost, installation cost and annual maintenance cost for device i, respectively. $AU_i^{DEV}$ is the annualization factor for device $$AU_i^{DEV} = r_i^{DEV} \frac{\left(1+r_i^{DEV}\right)^{T_i^{DEV}}}{\left(1+r_i^{DEV}\right)^{T_i^{DEV}} - 1}, \quad (54)$$

$r_i^{DEV}$ is the return rate per year, $T_i^{DEV}$ is the years of expected lifetime for device i.

The investments for devices (i.e. switches and storages) to be added are subject to budget limits in terms of maximum installation number, $\overline{N}^{DIV}$, and maximum investment cost, $\overline{CI}^{DEV}$, $DEV=\{SW, ES\}$:

$$\sum\nolimits_{i \in DEV^{NEW}} x_i^{DEV-inst} \leq \overline{N}^{DEV}, \quad (55)$$

$$\sum\nolimits_{i \in DEV^{NEW}} CI_i^{DEV} x_i^{DEV-inst} \leq \overline{CI}^{DEV}. \quad (56)$$

The objectives for section connected load and average N−1 contingency durations are used to reduce the size and expected failure duration of sections to be isolated. According to given locations of switches to be determined for installing, the set of candidate sections can be first generated, then the final sections can be generated by mering adjacent candidate sections based on the determined installment statues. For a section, if one of the switches is not existing one, that is its installation status is to be determined, we call this section as a flexible boundary section. If its installation status is determined as true, this candidate section becomes a fixed boundary section after the installation. If the installation status is false, this section will be merged with adjacent sections to be isolated together as one fixed boundary section.

The section connected net load objective is described as:

$$f^{sect\_mw} = \max_{s \in SS^{FLX}} \left( \overline{p}_s^{net} + \sum_{s' \in SS^{FLX}, s' \neq s} x_{s \leftrightarrow s'}^{con}, \overline{p}_{s'}^{net} \right) \quad (57)$$

where $SS^{FLX}$ is the set of flexible boundary sections. $\overline{p}_s^{net}$ is the maximum net load during normal operation for section s. $x_{s \leftrightarrow s'}^{con}$ is a binary variable to indicate if section s and section s' is connected, 1 indicates connected, 0 not connected.

The connected status between two sections s and s', $x_{s \leftrightarrow s'}^{con}$ is depending on the statuses for the connected paths between sections s and s'.

$$x_{s \leftrightarrow s'}^{con} = \vee_{p \in PT_{s \leftrightarrow s'}^{SECT}} x_{s \leftrightarrow s', p}^{con} \quad (58)$$

$PT_{s \leftrightarrow s'}^{SECT}$ is the set of paths connected sections s and s', and the switches included in the paths are candidate normally closed switches only. If any path of those paths is connected, then two sections are connected.

Any path connected status between two sections, $x_{s \leftrightarrow s', p}^{con}$ is determined by the candidate normally-closed switches located on the path. If all candidate switches are determined to be not installed, then the path status is connected. Otherwise, not connected.

$$x_{s \leftrightarrow s', p}^{con} = \wedge_{i \in SW_{s \leftrightarrow s', p}^{NC-NEW}} \left( 1 - x_i^{SW-inst} \right) \quad (59)$$

The maximum net load for section s, $\overline{p}_s^{net}$ is determined as the maximum sum of load demands within the section deducted by the local renewable generations and the difference between storage discharging and charging powers over all time periods for all normal operation scenarios.

$$\overline{p}_s^{net} = \max_{c \in \Omega^{NORM}, t \in T_c} p_{s,t,c}^{net} \quad (60)$$

$\Omega^{NORM}$ is the set of normal operation scenarios. Each scenario corresponds to a set of projected load demands, renewable generations.

The objective on average N−1 contingency duration, $f^{sect\_n1hr}$ is described as:

$$f^{sect\_n1hr} = \max_{s \in SS^{FLX}} \left( HR_s^{OUT} + \sum_{s' \in SS^{FLX}, s' \neq s} x_{s \leftrightarrow s'}^{con}, HR_{s'}^{OUT} \right) \quad (61)$$

$HR_s^{OUT}$ is the average contingency hours for N−1 contingency events in the flexible boundary section s, and calculated as:

$$HR_s^{OUT} = \Sigma_{l \in LN_{SFOR_l}} \cdot LEN_l \cdot RPR_l \quad (62)$$

$LN_s$ is the set of line segments within section s. $FOR_l$, $LEN_l$ and $RPR_l$ are the forced outage rate, the length and the failure repair duration of line 1, respectively.

The sum of tie pickup capacities provided by tie switches to be installed, $f^{tie\_cap}$ can be defined as:

$$f^{tie\_cap} = \sum_{i \in SW^{NO-NEW}} \left( x_i^{SW-inst} \sum_{s \in \{SS^{FDR-FR_i}, SS^{FDR-TO_i}\}} \overline{p}_s^{net} \right) \quad (63)$$

The tie pickup capacity for each switch i is defined as the sum of section connected net loads for all sections located on the two feeders connected by the switches, $FDR-FR_i$ and $FDR-TO_i$. $SS^{FDR-FR_i}$ and $SS^{FDR-TO_i}$ are the sections located within the feeder $FDR-FR_i$ and $FDR-TO_i$. The sections include both ones formed by existing switches, and ones by candidate switches.

For each pair of feeders that backups each other, at least one path tied by a tie switch exists:

$$\sum p \in PT_{fdr1 \leftrightarrow fdr2}^{FDR} \sum i \in SW_{fdr1 \leftrightarrow fdr2, p}^{NO} x_i^{SW-inst} \geq 1, \quad (64)$$

$$\forall \{fdr1, fdr2\} \in FDR^{pair}$$

where $FDR^{pair}$ is the set of backup feeder pairs. $PT_{fdr1 \leftrightarrow fdr2}^{FDR}$ is the set of paths connected feeders fdr1 with fdr2 if the tie switch on the path is closed. $SW_{fdr1 \leftrightarrow fdr2, p}^{NO}$ is the set of tie switches residing on path p between fdr1 and fdr2.

The energy reserve objective, $f^{soc\_resrv}$ is used to maximize the energy reserved from all storages to be used by blackout events such as black starts, or power shortages:

$$f^{soc\_resrv} = \sum_{i \in ES^{NEW}} SOC_{i,0} x_i^{ES-inst} + \sum_{i \in ES^{EXT}} SOC_{i,0} \quad (65)$$

$ES^{EXT}$ is the set of storages already existing in the system. $SOC_{i,0}$ is the minimum storage reversed for handling blackouts caused by network failures or supply shortages.

Another objective for evaluating the capability of the candidate storages to meet black start needs through discharging powers into its connected section. Black start here refers a blackout scenario that the entire distribution system lost the power supply from the main grid.

The storage discharging for black start objective, $f^{blkst\_dch\_mwh}$ is used to maximize the expected power discharged from the storages to meet critical loads or startup power required for re-starting local generations.

$$f^{blkst\_dch\_mwh} = \quad (66)$$

$$\sum_{c \in \Omega^{BLKST}} \rho_c \sum_{t \in T_c} \left( \sum_{i \in ES^{NEW}} p_{es,t,c}^{DCH} x_i^{ES-inst} + \sum_{i \in ES^{EXT}} p_{es,t,c}^{DCH} \right) \Delta T_{t,c}$$

$\Omega^{BLKST}$ is the set of black start scenarios, $\rho_c$ is the probability for scenario c, and $\Sigma_{c \in \Omega^{BLKST}} \rho_c = 1$.

During the black start, the storages for an existing section with new or existing storages should satisfy the critical loads and startup powers for local generations:

$$\sum_{i \in ES_s^{NEW}} p_{es,t,c}^{DCH} x_i^{ES-inst} + \sum_{i \in ES_s^{EXT}} p_{es,t,c}^{DCH} \geq \quad (67)$$

$$\delta_s^{critical} \left( \sum_{ld \in LD_s} P_{ld,t,c}^D - \sum_{sl \in SL_s} P_{sl,t,c}^G - \sum_{wd \in WD_s} P_{wd,t,c}^G \right),$$

$$\forall s \in SS^{FXD\_ES}$$

$SS^{FXD\_ES}$ is the set of fixed boundary sections with storages, $\delta_s^{critical}$ is the ratio of critical load and startup powers. $ES_s^{NEW}$ and $ES_s^{EXT}$ are the sets of new and existing storages in the section s.

For candidate section with new or existing storages, it has to take adjacent candidate sections together to consider the critical loads and startup powers needs based on the connected status between candidate sections:

$$\sum_{i \in ES_s^{NEW}} p_{es,t,c}^{DCH} x_i^{ES-inst} + \sum_{i \in ES_s^{EXT}} p_{es,t,c}^{DCH} + \tag{68}$$

$$\sum_{s' \in SS^{FLX}, s' \neq s} x_{s \leftrightarrow s'}^{con} \left( \sum_{i \in ES_{s'}^{NEW}} p_{es,t,c}^{DCH} x_i^{ES-inst} + \sum_{i \in ES_{s'}^{EST}} p_{es,t,c}^{DCH} \right) \geq$$

$$\delta_s^{critical} \left( \sum_{ld \in LD_s} P_{ld,t,c}^D - \sum_{SL \in sl_s} p_{SL,t,c}^G - \sum_{sl \in SL_s} P_{sl,t,c}^G - \sum_{wd \in WD_s} p_{wd,t,c}^G \right) +$$

$$\sum_{s' \in SS^{FLX}, s' \neq s} x_{s \leftrightarrow s'}^{co} \delta_{s'}^{critical} \left( \sum_{ld \in LD_{s'}} P_{ld,t,c}^D \sum_{SL \in SL_{s'}} P_{sl,t,c}^G - \sum_{wd \in WD_{s'}} P_{wd,t,c}^G \right),$$

$$\forall s \in SS^{FXD\_ES}$$

where $SS^{FLX_{ES}}$ is the set of flexible boundary sections with storages.

The objective $f^{norm\_oper\_cost}$ is defined to minimize the expected operation cost for the system under normal operation scenarios, including substation supplied power cost, switch operation wear cost, storage charging and discharging wear cost, and section energy lost cost:

$f^{norm\_oper\_cost}$ $$= \sum_{c \in \Omega^{NORM}} \rho_c \tag{69}$$

$$\left( \sum_{t \in T_c} \left( \sum_{sub \in SUB} \gamma_{t,c}^G P_{sub,t,c}^G \Delta T_{t,c} + \sum_{es \in ES} \gamma_{es}^{ES} \left( p_{es,t,c}^{DCH} + p_{es,t,c}^{CH} \right) \Delta T_{t,c} + \right. \right.$$

$$\left. \left. \sum_{s \in SS} \gamma_{t,c}^{LOST} x_{s,t,c}^{isolated} p_{s,t,c}^{DNET} \Delta T_{t,c} \right) + \sum_{sw \in SW} \gamma_{sw}^{SW} \left| x_{sw,t,c}^{closed} - x_{sw,t-1,c}^{closed} \right| \right)$$

$\Omega^{NORM}$ is the set of normal operation scenarios, and $\Sigma_{c \in \Omega^{NORM}} \rho_c = 1$. $\gamma_{t,c}^G$, $\gamma_{sw}^{SW}$, $\gamma_{es}^{ES}$ and $\gamma_{t,c}^{LOST}$ are the unit power generation cost, the unit switching operation wear cost, the unit storage charging, and discharging wear cost, and the unit lost energy cost.

The objectives for evaluating rolling blackout performances are defined as:

$$f^{roll\_out\_mwh} = \sum_{c \in \Omega^{ROLL}} \rho_c \left( \sum_{s \in SS} \sum_{t \in T_c} x_{s,t,c}^{isolated} p_{s,t,c}^{net} \Delta T_{t,c} \right) \tag{70}$$

$$f^{roll\_sw\_fq} = \tag{71}$$

$$\sum_{c \in \Omega^{ROLL}} \rho_c \left( \sum_{sw \in ESW} \sum_{t \in T_c} \left| x_{sw,t,c}^{closed} - x_{sw,t-1,c}^{closed} \right| \right)$$

$$f^{roll\_out\_hr} = \sum_{c \in \Omega^{ROLL}} \rho_c \max_{s \in SS} \sum_{t \in T_c} x_{s,t,c}^{isolated} \Delta T_{t,c} \tag{72}$$

$$f^{roll\_out\_fq} = \sum_{c \in \Omega^{ROLL}} \rho_c \left( \max_{s \in SS} \sum_{t \in T_c} x_{s,t,c}^{out} \right) \tag{73}$$

$$f^{roll\_diff\_out\_hr} = \sum_{c \in \Omega^{ROLL}} \rho_c \max_{\substack{s1, s2 \in SS \\ s1 \neq s2}} \left| \sum_{t \in T_c} \left( x_{s1,t,c}^{isolated} - x_{s2,t,c}^{isolated} \right) \Delta T_{t,c} \right| \tag{74}$$

$$f^{roll\_diff\_out\_fq} = \sum_{c \in \Omega^{ROLL}} \rho_c \max_{\substack{s1, s2 \in SS \\ s1 \neq s2}} \left| \sum_{t \in T_c} \left( x_{s1,t,c}^{out} - x_{s2,t,c}^{out} \right) \right| \tag{75}$$

where $\Omega^{ROLL}$ is the set of scenarios for generation efficiency scenarios, and $\Sigma_{c \in \Omega^{ROLL}} \rho_c = 1$.

The constraints for the optimizations include the radial operation requirement, power balance and power flow requirement, switch capacity limit and storage energy balance requirements, and constraints specified to operational scenarios.

For any normal and rolling scenario, the operational statuses for switches to be installed are related to their installment statuses, according to:

$$x_{i,t,c}^{closed} \geq (1 - x_i^{SW-inst}), \forall i \in SW^{NC-NEW}, t \in T_c, c \in \{\Omega^{NORM}, \Omega^{ROLL}\} \tag{76}$$

$$x_{i,t,c}^{closed} \leq x_i^{SW-inst}, \forall i \in SW^{NO-NEW}, t \in T_c, c \in \{\Omega^{NORM}, \Omega^{ROLL}\} \tag{77}$$

This set of relationship between build and operation of switches to ascertain normally-closed switches are treated as closed links, and normally-open switches as open links, if not installed.

The radial operation constraints are applied to both normal and rolling scenarios. Therefore, for any path between any two of feeder heads, at least one of switches along the path between two feeder heads must be at open state:

$$\sum_{sw \in SW_{fdr1 \leftrightarrow fdr2, p}^{FDR}} x_{sw,t,c}^{closed} \leq \left( \sum_{sw \in SW_{fdr1 \leftrightarrow fdr2, p}^{FDR}} 1 \right) - 1, \forall fdr1, \tag{78}$$

$$fdr2 \in FDR, fdr1 \neq fdr2r \in T_c, c \in \{\Omega^{NORM}, \Omega^{ROLL}\}$$

Under any normal or rolling scenario, power balance or power flow constraints are required for both the substations and feeder sections. For any substation, the power supplied from main grid matches the sum of power entered into the distribution system through feeders:

$$p_{sub,t,c}^G = \sum_{fdr \in FDR_{sub}} \sum_{SW \in SW_{fdr}^{CB}} \left( f_{sw,t,c}^+ - f_{sw,t,c}^- \right), \tag{79}$$

$$\forall sub \in SUB, T \in T_c, c \in \{\Omega^{NORM}, \Omega^{ROLL}\}$$

The power shorage for power grid is described by the upper and lower envelops for each substation under the given scenario along the shoratge horizon.

$$\underline{P}_{sub,t,c}^G \leq p_{sub,t,c}^G \leq \overline{P}_{sub,t,c}^G, \forall sub \in SUB, t \in T_c, c \in \{\Omega^{NORM}, \Omega^{ROLL}\} \tag{80}$$

During normal operation scenarios, for each substation, the power supplied from the substation and the stoarges must satisfy the up and down reserve requirements for each time period of normal operations.

$$\sum_{s \in SECT} x_{sub \leftrightarrow s}^{energized} \left( (1 + RESRV_{t,c}^{UP}) \sum_{ld \in LD_s} P_{ld,t,c}^D - \right. \tag{81}$$

$$\left. \sum_{sl \in SL_s} P_{sl,t,c}^G - \sum_{wd \in WD_s} P_{wd,t,c}^G + \sum_{es \in ES_s} \left( p_{es,t,c}^{CH} - p_{es,t,c}^{DCH} \right) \right) \leq$$

$$\overline{P}_{sub,t,c}^G, \forall sub \in SUB, t \in T_c, c \in \Omega^{NORM}$$

-continued $$\sum_{s \in SECT} x_{sub \leftrightarrow s}^{energized} \left( (1 - RESRV_{t,c}^{DN}) \sum_{ld \in LD_s} P_{ld,t,c}^D - \sum_{sl \in SL_s} P_{sl,t,c}^G - \sum_{wd \in WD_S} P_{wd,t,c}^G + \sum_{es \in ES_s} \left( p_{es,t,c}^{CH} - p_{es,t,c}^{DCH} \right) \right) \geq P_{sub,t,c}^G, \quad (82)$$

$$\forall \, sub \in SUB, \, T \in T_c, \, c \in \Omega^{NORM}$$

$RESRV_{t,c}^{UP}$ and $RESRV_{t,c}^{DN}$ are the up reserve and down reserve rate. $x_{sub \leftrightarrow s}^{energized}$ is a binary variable to indicate if section s is energized by substation sub through paths between substation sub and section s, 1 indicates yes, 0 indicates no.

The connected status between substation sub and section s, $x_{sub \leftrightarrow s}^{energized}$ is depending on the statuses for the energized paths between substation sub and section s.

$$x_{sub \leftrightarrow s}^{energized} = \vee_{p \in PT_{sub \leftrightarrow s}^{SUB-SECT}} x_{sub \leftrightarrow s,p}^{energized} \quad (83)$$

$PT_{sub \leftrightarrow s}^{SUB-SECT}$ is the set of paths can be used to energize sections s by substation sub. $x_{sub \leftrightarrow s,p}^{energized}$ is the energized status of path p between substation sub and section s, and is determined by the closed statuses of switches on the path, according to:

$$x_{sub \leftrightarrow s,p}^{energized} = \wedge_{i \in SW_{sub \leftrightarrow s,p}^{PATH}} x_{i,t,c}^{closed} \quad (84)$$

$SW_{sub \leftrightarrow s,p}^{PATH}$ is the set of switches on path p between substation sub and section s.

The isolated status for a section s, $x_{s,t,c}^{isolated}$ can be determined based on energized status of paths between substations to the section as:

$$x_{s,t,c}^{isolated} = 1 - \vee_{sub \in SUB} x_{sub \leftrightarrow s}^{energized} \quad (85)$$

For feeder section, the power balance is activated only when the section is energized.

$$(1 - x_{s,t,c}^{isolated}) p_{s,t,c}^{net} = \sum_{sw \in SW_s} (f_{sw,t,c}^+ - f_{sw,t,c}^-), \\ \forall s \in SS, t \in T_c, c \in \{\Omega^{NORM}, \Omega^{ROLL}\} \quad (86)$$

The power flows of the switches are also limited by their maximum capacities as:

$$f_{sw,t,c}^+ \leq x_{sw,t,c}^{closed} \overline{F}_{sw,c} \quad (87)$$

$$f_{sw,t,c}^- \leq x_{sw,t,c}^{closed} \overline{F}_{sw,c} \quad (88)$$

The storage is regulated by the energy balance model and stoarge charging and discharging status which also regulated by the installation status for new storages. For any normal and rolling scenario, the enrgy balance is described as:

$$SOC_{es,t,c} = (1 - \varepsilon_{es}) SOC_{es,t-1,c} + \eta_{es}^{CH} \frac{p_{es,t,c}^{CH} \Delta T_{t,c}}{\overline{E}_{es}} - \frac{p_{es,t,c}^{DCH} \Delta T_{t,c}}{\eta_{es}^{DCH} \overline{E}_{es}}, \quad (89)$$

$$\forall \, es \in ES, \, \forall \, t \in T_c, \, c \in \{\Omega^{NORM}, \Omega^{ROLL}\}$$

For the time period t=1, the energy balance must consider the installment status for a candidate storage as:

$$SOC_{es,1,c} = (1 - \varepsilon_{es}) x_i^{ES-inst} SOC_{es,0} + \eta_{es}^{CH} \frac{p_{es,t,c}^{CH} \Delta T_{t,c}}{\overline{E}_{es}} - \frac{p_{es,t,c}^{DCH} \Delta T_{t,c}}{\eta_{es}^{DCH} \overline{E}_{es}}, \quad (90)$$

$$\forall \, es \in ES^{NEW}$$

$$\underline{SOC}_{es,c} \leq x_i^{ES-inst} SOC_{es,t,c} \leq \overline{SOC}_{es,c}, \forall \, es \in ES^{NEW} \quad (91)$$

$$\underline{SOC}_{es,c} \leq SOC_{es,t,c} \leq \overline{SOC}_{es,c}, \forall \, es \in ES^{EXT} \quad (92)$$

For normal scenarios, the state of charges for each stoarrges must be not less than reserved ones.

$$SOC_{es,t,c} \geq x_i^{ES-inst} SOC_{es,0}, \forall es \in ES^{NEW}, t \in T_c, c \in \Omega^{BLKST} \quad (93)$$

$$SOC_{es,t,c} \geq SOC_{es,0}, \forall es \in ES^{EXT}, t \in T_c, c \in \Omega^{NORM} \quad (94)$$

The charging and discharging statuses are limited by follows:

$$x_{es,t,c}^{CH} + x_{es,t,c}^{DCH} \leq x_i^{ES-inst}, \forall es \in ES^{NEW}, \forall t \in T_c \quad (95)$$

$$x_{es,t,c}^{CH} + x_{es,t,c}^{DCH} \leq 1, \forall es \in ES^{EXT}, \forall t \in T_c \quad (96)$$

$$0 \leq p_{es,t,c}^{CH} \leq x_{es,t,c}^{CH} \overline{P}_{es}^{CH}, \forall es \in ES, \forall t \in T_c \quad (97)$$

$$0 \leq p_{es,t,c}^{DCH} \leq x_{es,t,c}^{DCH} \overline{P}_{es}^{DCH}, \forall es \in ES, \forall t \in T_c \quad (98)$$

However, for a black start scenario, since only dischaging status is reasonable, so above stoarge model should be simplified to include only dischaging, for eaxple, the enrgy balance equiation for black start scenario is reduced as:

$$SOC_{es,t,c} = (1 - \varepsilon_{es}) SOC_{es,t-1,c} - \frac{p_{es,t,c}^{DCH} \Delta T_{t,c}}{\eta_{es}^{DCH} \overline{E}_{es}}, \quad (99)$$

$$\forall \, es \in ES, \, T \in T_c, \, C \in \Omega^{BLKST}$$

The satisfaction functions may be defined using ReLU functions for each objective, including ReLU$^+$ functions for objectives $f^{tie\_cap}$, $f^{soc\_resrv}$ and $f^{blkst\_dch\_mwh}$, and ReLU$^-$ for objectives $f^{annual\_cost}$, $f^{sect\_mw}$, $f^{sect\_n1hr}$, $f^{norm\_oper\_cost}$, $f^{roll\_out\_mwh}$, $f^{roll\_sw\_fq}$, $f^{roll\_out\_hr}$, $f^{roll\_out\_fq}$, $f^{roll\_diff\_out\_hr}$ and $f^{roll\_diff\_out\_fq}$. Thereafter, the following optimization model is available to determine the optimal placement scheme for switches and storages.

maximize $\Sigma_{obj \in OBJ^-} \omega^{obj} \text{ReLU}^-(f^{obj}) + \Sigma_{obj \in OBJ^+}$
$\omega^{obj} \text{ReLU}^+(f^{obj}) + \lambda$ (100)

subject to: $\text{ReLU}^-(f^{annual\_cost}) \geq \omega^{annual\_cost} \lambda$ (101)

$\text{ReLU}^-(f^{sect\_mw}) \geq \omega^{sect\_mw} \lambda$ (102)

$\text{ReLU}^-(f^{sect\_n1hr}) \geq \omega^{sect\_n1hr} \lambda$ (103)

$\text{ReLU}^+(f^{tie\_cap}) \geq \omega^{tie\_cap} \lambda$ (104)

$\text{ReLU}^+(f^{soc\_resrv}) \geq \omega^{soc\_resrv} \lambda$ (105)

$\text{ReLU}^+(f^{blkst\_dch\_mwh}) \geq \omega^{blkst\_dch\_mwh} \lambda$ (106)

$\text{ReLU}^-(f^{norm\_oper\_cost}) \geq \omega^{norm\_oper\_cost} \lambda$ (107)

$\text{ReLU}^-(f^{roll\_out\_mwh}) \geq \omega^{roll\_out\_mwh} \lambda$ (108)

$\text{ReLU}^-(f^{roll\_sw\_fq}) \geq \omega^{roll\_sw\_fq} \lambda$ (109)

$$\text{ReLU}^-(f^{roll\_out\_hr}) \geq \omega^{roll\_out\_hr} \lambda \quad (110)$$

$$\text{ReLU}^-(f^{roll\_out\_fq}) \geq \omega^{roll\_out\_fq} \lambda \quad (111)$$

$$\text{ReLU}^-(f^{roll\_diff\_out\_hr}) \geq \omega^{roll\_diff\_out\_fq} \lambda \quad (112)$$

$$\text{ReLU}^-(f^{roll\_diff\_out\_fq}) \geq \omega^{roll\_diff\_out\_fq} \lambda \quad (113)$$

Equations (52)-(99)

where $OBJ^+$ is the set of objectives that modeled using $ReLu^+$ functions.

Using directed feasible region method, the above method can also be converted into a standard MILP to be solved. The solution of the converted model provide an optimal placement scheme for switches and storages. Through implementation of the determined placement scheme to place switches and storages at determined locations with determined ratings, a distribution system with capability for fairer blackout rotation can be achieved.

Example

Some exemplar usage of presented methods may be demonstrated by using the sample system illustrated by FIG. 2 and FIG. 6. The power shortage scenario is that 50% generation capacity of the main grid will be lost for 24 hours.

Figure 8A:
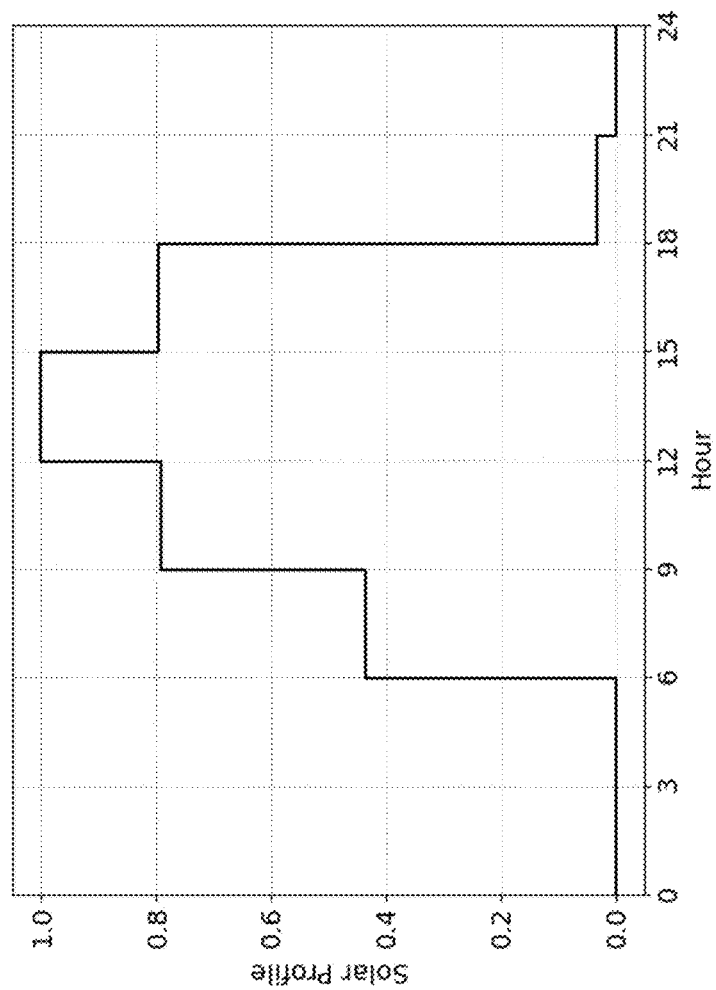
FIG. 8A is a schematic illustrating the hourly per-unit generation profile for a solar plant of the sample system of FIG. 2 or FIG. 6, according to some example embodiments.
Figure 8B:
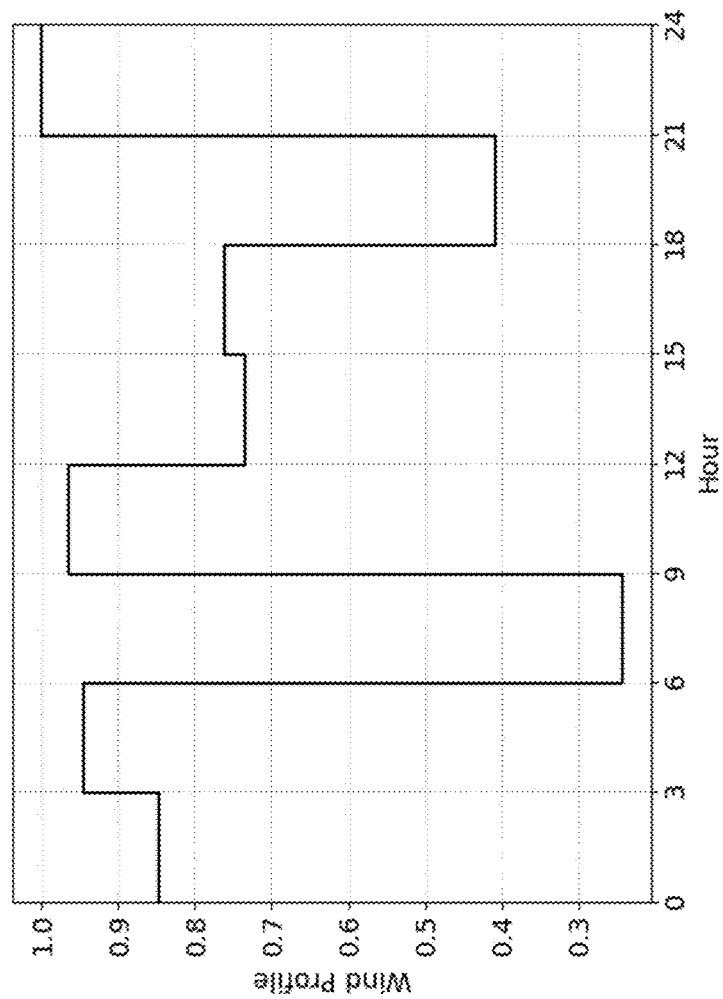
FIG. 8B is a schematic illustrating the hourly per-unit generation profile for a wind plant of the sample system of FIG. 2 or FIG. 6, according to some example embodiments.
Figure 9A:
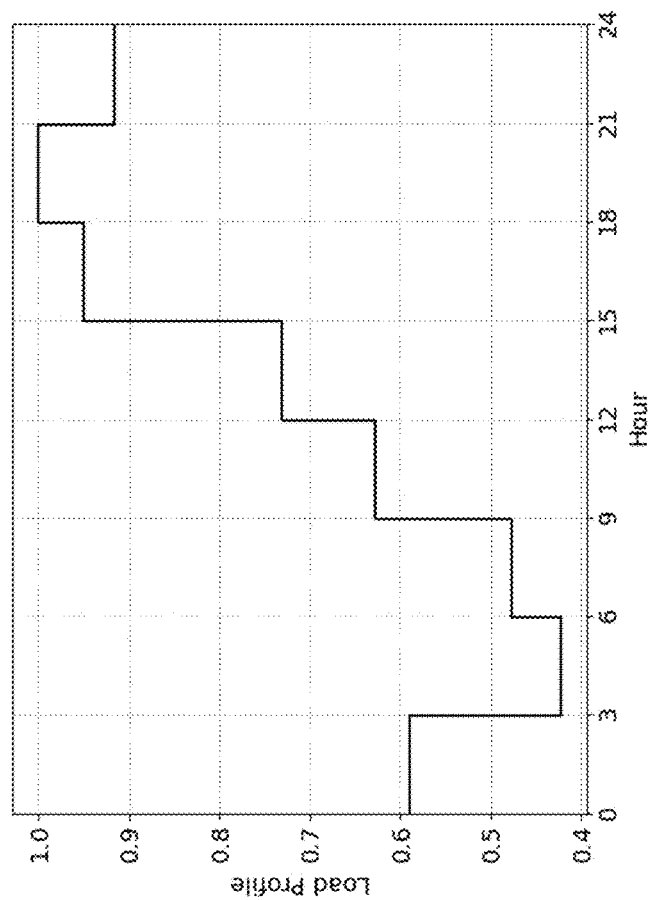
FIG. 9A is a schematic illustrating the typical per-unit hourly load profile for a load of the sample system of FIG. 2 or FIG. 6, according to some example embodiments.
Figure 9B:
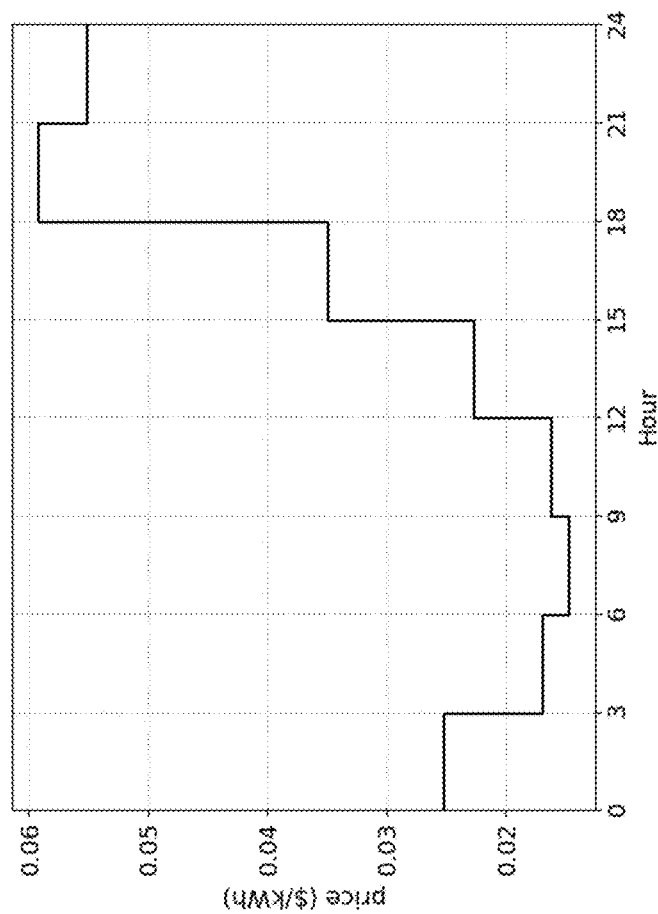
FIG. 9B is a schematic illustrating the hourly electricity price profile charged to a load of the sample system of FIG. 2 or FIG. 6, according to some example embodiments.
Figure 10:
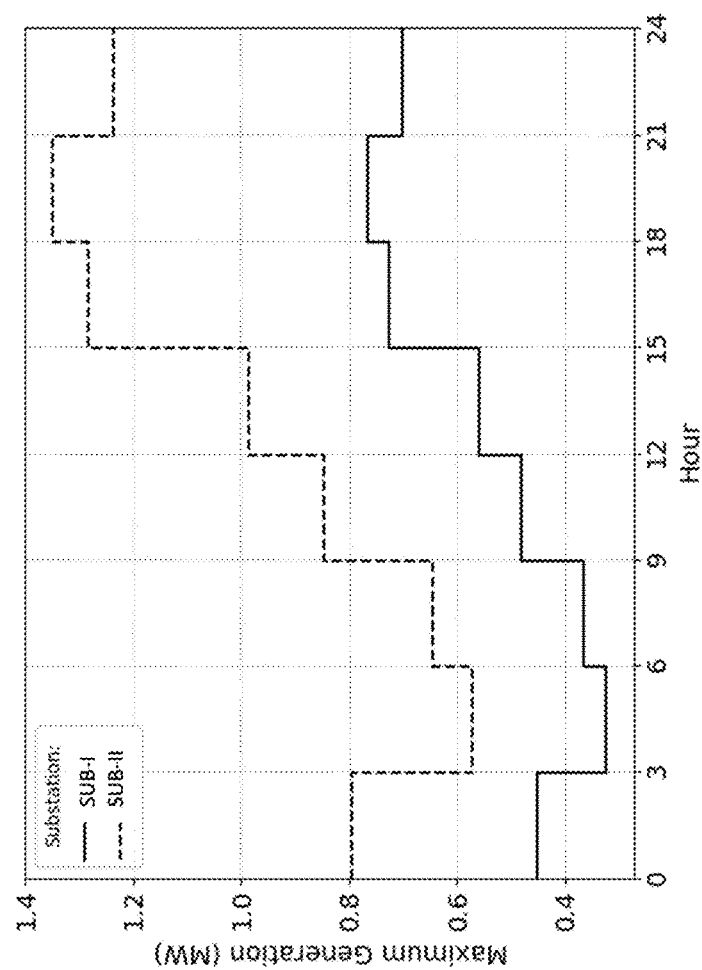
FIG. 10 is a schematic illustrating the projected maximum power generations of the substations of the sample system of FIG. 2 or FIG. 6, according to some example embodiments.

The projected per-unit hourly generation profiles for solar plants and wind plants are given by FIG. 8A and FIG. 8B. The typical per-unit hourly load profile and corresponding price profiles are given in FIG. 9A and FIG. 9B. The projected maximum power generations for two substations in the sample system under power shortage scenario is given in FIG. 10.

Blackout Rotation with Fixed System Configuration

FIG. 2 is used to generate blackout rotation scheme with fixed system configuration. First, a blackout rotation scheme, Plan I is generated using only lost energy objective that commonly used by the distribution systems. The determined scheme and its evaluated attributes are listed in Tables I-1, I-2 and I-3 below.

TABLE I-1

Evaluation Attributes for Rotation Plan I

| Attribute Name | Value | Expected Ranges |
|---|---|---|
| Lost Energy (MWh) | 22.64 | [0, 60] |
| Switching times | 2 | [0, 100] |
| Maximum blackout hours | 24 | [0, 24] |
| Maximum blackout times | 1 | [0, 10] |
| Maximum blackout-hour difference | 24 | [0, 24] |
| Maximum blackout-times difference | 1 | [0, 10] |

TABLE I-2

Blackout Schedule for Rotation Plan I

| Section | 0:00-3:00 | 3:00-6:00 | 6:00-9:00 | 9:00-12:00 | 12:00-15:00 | 15:00-18:00 | 18:00-21:00 | 21:00-24:00 |
|---|---|---|---|---|---|---|---|---|
| SECT-II-1 | X | X | X | X | X | X | X | X |
| SECT-II-2 | X | X | X | X | X | X | X | X |
| SECT-VI-1 | X | X | X | X | X | X | X | X |

TABLE I-3

Switch operations for Rotation Plan I

| Blackout Period | Switch Operations |
|---|---|
| 0:00-3:00 | Open: 195-95, 610-61 |

Figure 11:
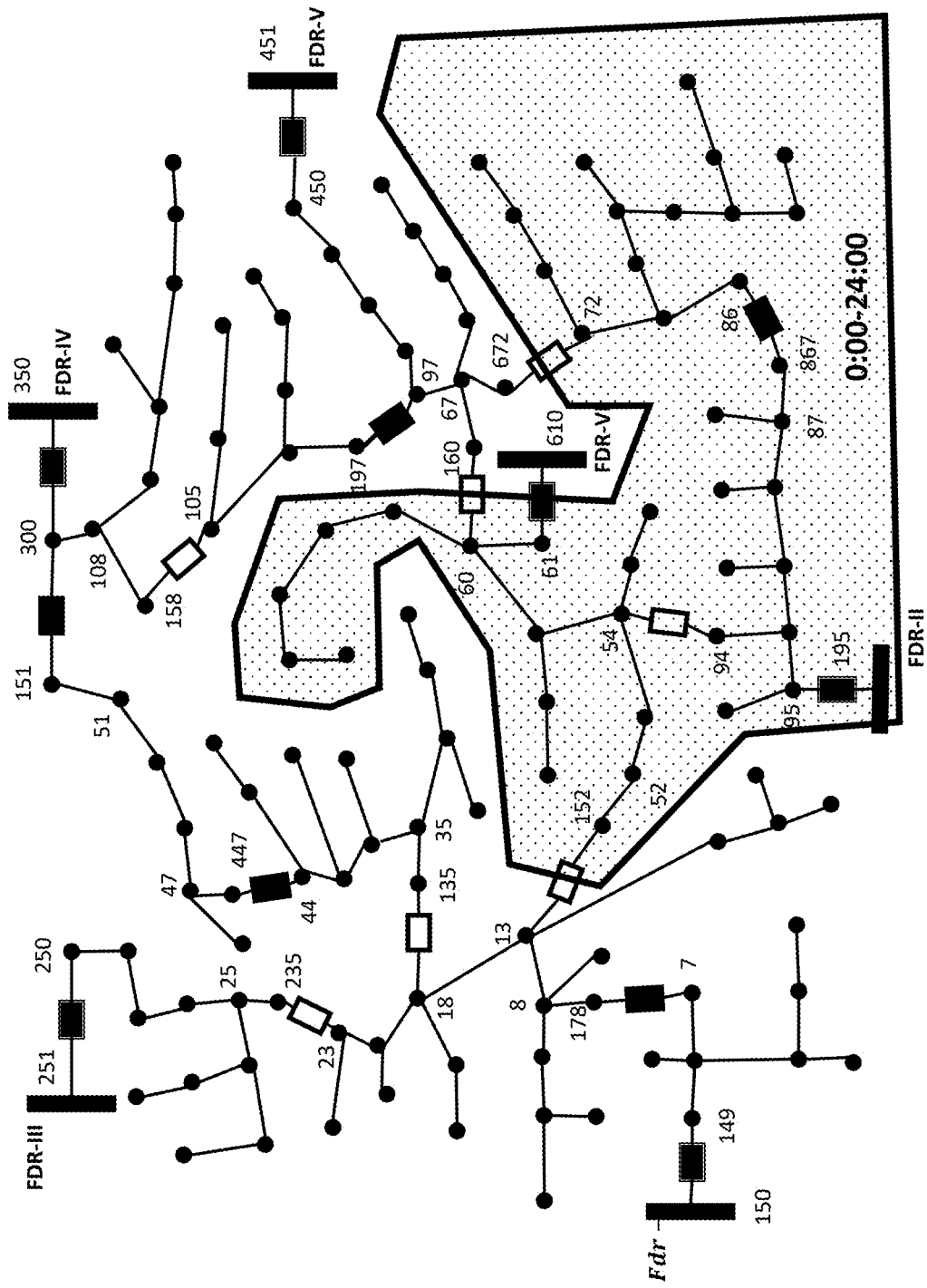
FIG. 11 is a schematic illustrating the blackout rotation schedule determined by optimizing total lost energy for each portion of the sample system of FIG. 2, according to some example embodiments.

As shown in Table I-1 and Table I-3, the lost energy for this plan is 22.64 MWh, and the switch operation times is 2. The blackout schedule is listed in Table I-2, and illustrated in FIG. 11. As shown in FIG. 11, feeders FDR-II and FDR-VI have experienced a blackout for 24 hours. All other feeders are maintaining normal power supply during entire shortage period.

Obviously, the scheme presented in plan I does not generate a fair rotation among all customers. As indicated in FIG. 11 and Table I-2, some customers experience longer blackout, lasting for 24 hours. Meanwhile, some other customers do not have any blackout at all. It causes significant biased services to the customers.

Next, another blackout rotation scheme, Plan II is determined using all objectives for interests of both customers and the system. The determined scheme and its evaluated attributes are listed in Tables II-1, II-2 and II-3.

Comparing with plan I, the lost energy of plan II is slightly increasing 14.62% and reached 25.95 MWh, and a large number of switching operations is required, i.e. 26 times instead of 2 times for plan I. However, the customers/consumers experienced shorter blackout and fair blackout rotation. The maximum blackout hours are reduced 50.0%, from 24 hours to 12 hours, and the maximum blackout hour difference is 3 hours instead of 24 hours for plan I, decreased 75%.

Figure 12:
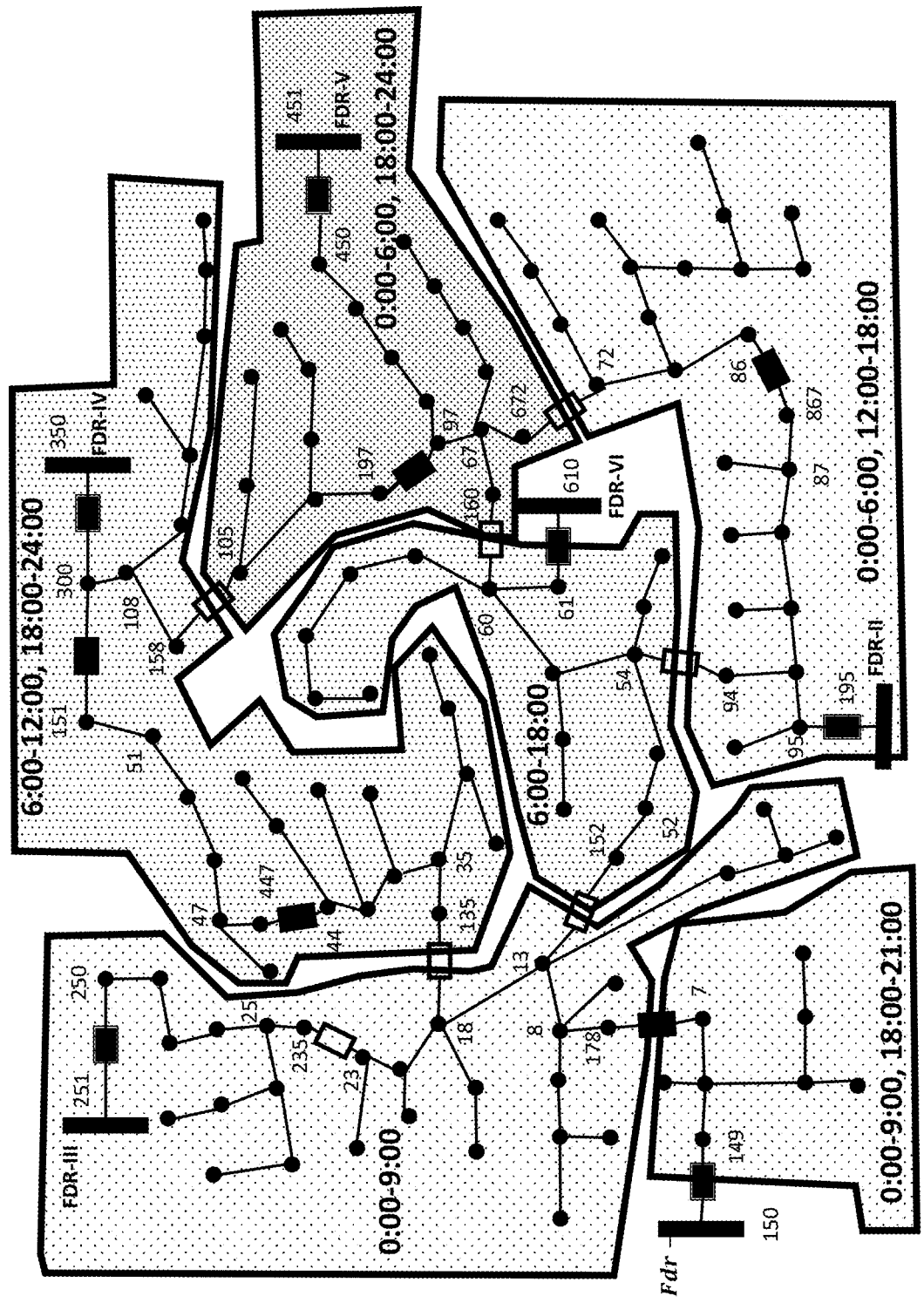
FIG. 12 is a schematic illustrating the blackout rotation schedule determined by optimizing multiple objectives for both the system and the customers for each portion of the sample system of FIG. 2, according to some example embodiments.

The blackout rotation schedule is illustrated in FIG. 12. As shown in the figure, the blackout is rotated among 6 different portions, and only 3-hour difference is observed for blackouts among different portions of the system.

TABLE II-1

Evaluation Attributes for Rotation Plan II

| Attribute Name | Value | Expected Ranges |
|---|---|---|
| Lost Energy (MWh) | 25.95 | [0, 60] |
| Switching times | 26 | [0, 100] |
| Maximum blackout hours | 12 | [0, 24] |
| Maximum blackout times | 2 | [0, 10] |
| Maximum blackout-hour difference | 3 | [0, 24] |
| Maximum blackout-times difference | 0 | [0, 10] |

TABLE II-2

Blackout Schedule for Rotation Plan II

| Section | 0:00-3:00 | 3:00-6:00 | 6:00-9:00 | 9:00-12:00 | 12:00-15:00 | 15:00-18:00 | 18:00-21:00 | 21:00-24:00 |
|---|---|---|---|---|---|---|---|---|
| SECT-I-1 | X | X | X | | | | X | |
| SECT-I-2 | X | X | X | | | | | |
| SECT-II-1 | X | X | | | X | X | | |
| SECT-II-2 | X | X | | | X | X | | |
| SECT-III-1 | X | X | X | | | | | |
| SECT-IV-1 | | | X | X | | | X | X |
| SECT-IV-2 | | | X | X | | | X | X |
| SECT-IV-3 | | | X | X | | | X | X |
| SECT-V-1 | X | X | | | | | X | X |
| SECT-V-2 | X | X | | | | | X | X |
| SECT-VI-1 | | | X | X | X | X | | |

TABLE II-3

Switch operations for Rotation Plan II

| Blackout Period | Switch Operations |
|---|---|
| 0:00-3:00 | Close: 72-672; Open: 150-149, 195-95, 251-250, 451-450 |
| 6:00-9:00 | Close: 195-95, 451-450; Open: 350-300, 610-61, 867-86 |
| 9:00-12:00 | Close: 150-149, 251-250, 867-86; Open: 195-95 |
| 12:00-15:00 | Close: 18-135, 158-105; Open: 72-672 |
| 18:00-21:00 | Close: 195-95, 610-61, 13-152, 23-235 Open: 150-149, 451-450, 7-178, 18-135 |
| 21:00-24:00 | Close: 7-178 |

Blackout Rotation with Resilience Enhanced System Configuration

Some exemplar but non-limiting test scenarios are discussed next. The proposed model may be tested with the sample system with resilience enhancement, illustrated by FIG. 6. Assumed there are 5 candidate storages at nodes 7,36,58,105,72 with capacities 500 kWh/50 kW per phase, and 5 candidate normally-closed switches on branches 47-479, 13-138, 57-576, 78-788, and 72-726. The test scenarios include one normal scenario, and one power shortage scenario in which 50% generation capacity of the main grid will be lost for 24 hours.

Using the optimization model described above, we obtained a final solution in which all candidate storages are determined to be installed, and for the switch, the switch on 78-788 is chosen to be installed.

Based on this resilience reinforced system, the blackout rotation scheme for the same power shortage scenario that we used above is generated. The determined scheme and its evaluated attributes are listed in Tables III-1, III-2 and III-3.

For plan III, it has much less lost energy, 20.60 MWh compared with Plan I and II, and the switches also operates with a reasonable number of times, i.e. 13 times. The lost energy decrease is resulted by the utilization of storage discharging and the maximum connected load reducing by additional switch installation. The maximum blackout duration difference is 12 hours, and maximum blackout times is 2. This plan shows better fairness for the rotation compared with plan I. Same as plan II, it only has 3 hours maximum blackout duration difference, and maximum blackout times difference is 1, but much less switch operations.

TABLE III-1

Evaluation Attributes for Rotation Plan III

| Attribute Name | Value | Expected Ranges |
|---|---|---|
| Lost Energy (MWh) | 20.60 | [0, 60] |
| Switching times | 13 | [0, 100] |
| Maximum blackout hours | 12 | [0, 24] |
| Maximum blackout times | 2 | [0, 10] |
| Maximum blackout-hour difference | 3 | [0, 24] |
| Maximum blackout-times difference | 1 | [0, 10] |

TABLE III-2

Blackout Schedule for Rotation Plan III

| Section | 0:00-3:00 | 3:00-6:00 | 6:00-9:00 | 9:00-12:00 | 12:00-15:00 | 15:00-18:00 | 18:00-21:00 | 21:00-24:00 |
|---|---|---|---|---|---|---|---|---|
| SECT-I-1 | X | X | X | | | | | |
| SECT-I-2-1 | X | X | X | | | | | |
| SECT-I-2-2 | X | X | X | | | | | |
| SECT-II-1 | X | X | | | | X | X | |
| SECT-II-2-1 | | | | X | X | X | X | |
| SECT-II-2-2 | | | | X | X | X | X | |
| SECT-II-2-3 | | | | X | X | X | X | |
| SECT-III-1 | X | X | X | | | | | |
| SECT-IV-1 | | | | X | X | | | X |
| SECT-IV-2-1 | | | | X | X | | | X |
| SECT-IV-2-2 | | | | X | X | | | X |
| SECT-IV-3 | | | | X | X | | | X |
| SECT-V-1 | | | | | X | X | X | X |
| SECT-V-2 | | | | | X | X | X | X |

TABLE III-2-continued

Blackout Schedule for Rotation Plan III

| Section | 0:00-3:00 | 3:00-6:00 | 6:00-9:00 | 9:00-12:00 | 12:00-15:00 | 15:00-18:00 | 18:00-21:00 | 21:00-24:00 |
|---|---|---|---|---|---|---|---|---|
| SECT-VI-1-1 | X | X | X | | | | | |
| SECT-VI-1-2 | X | X | X | | | | | |

TABLE III-3

Switch operations for Rotation Plan III

| Blackout Period | Switch Operations |
|---|---|
| 0:00-3:00 | Open: 150-149, 251-250, 610-61 |
| 6:00-9:00 | Open: 350-300 |
| 9:00-12:00 | Close: 150-149, 251-250, 610-61; Open: 195-95, 451-450 |
| 12:00-15:00 | Close: 350-300 |
| 18:00-21:00 | Close: 72-672 |
| 21:00-24:00 | Close: 350-300; Open: 451-450 |

Figure 13:
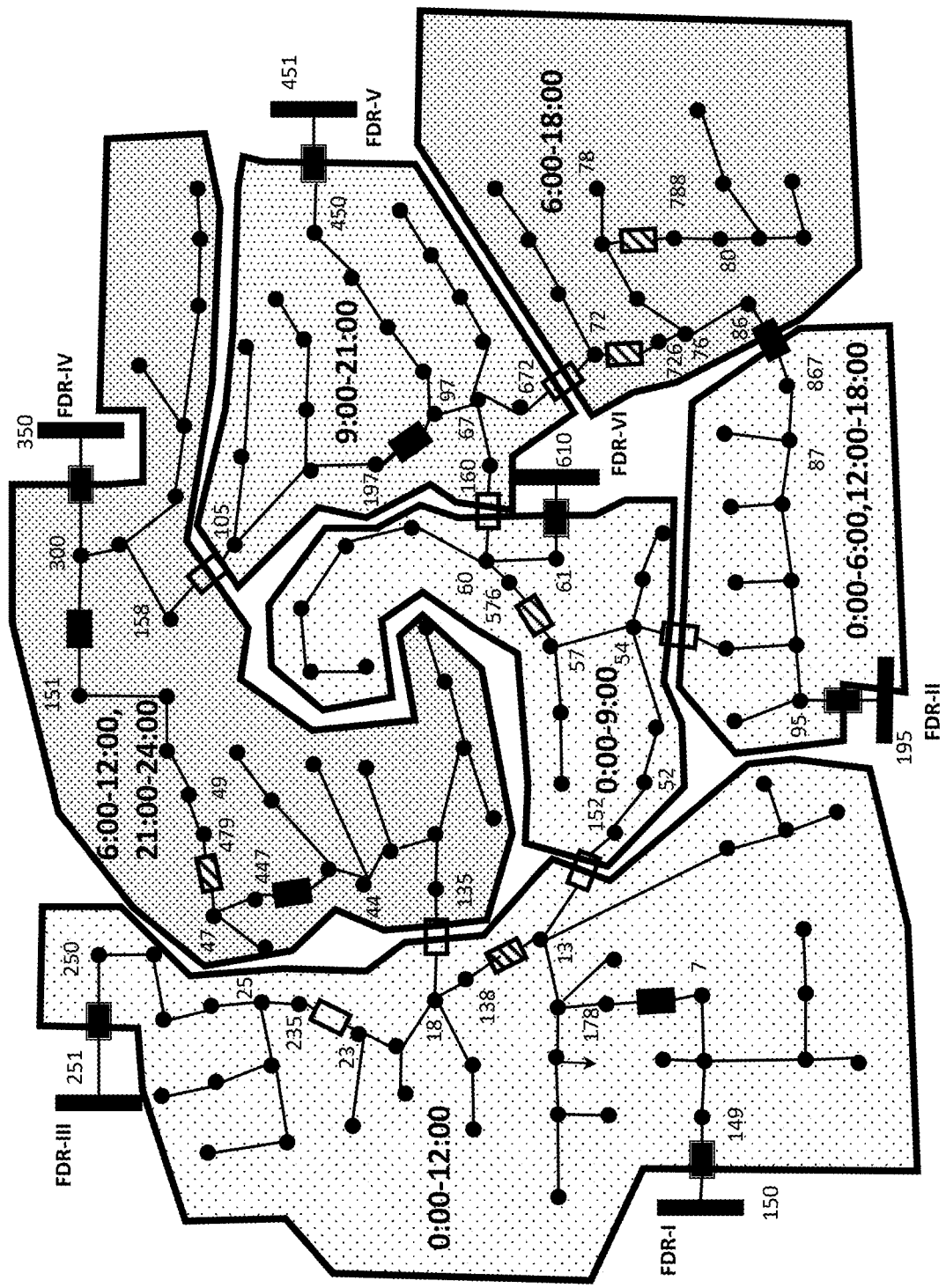
FIG. 13 is a schematic illustrating the blackout rotation schedule for the sample system of FIG. 6 with resilience reinforcement for switches and storage, according to some example embodiments.

FIG. 13 shows the blackout rotation schedule given by plan III. It is rotated among 6 portions of the system, and each portion includes a set of sections separated by switches.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

I claim:

1. A control system for controlling a power flow of available energy in a power distribution system, comprising: a processor; and a memory having instructions stored thereon that, when executed by the processor, cause the control system to:
   collect a graph-based representation of the power distribution system as a radial tree of a plurality of nodes connected by a plurality of edges, wherein each node of the plurality of nodes represents a section of the power distribution system isolated by one or more switches from other parts of the power distribution system when the one or more switches are at open positions, wherein each edge of the plurality of edges connecting a node with a neighboring node represents a switch that connects a section represented by the node with a neighboring section represented by the neighboring node, wherein each of the plurality of nodes has a property of power demand of a corresponding section governed by a difference between energy demanded by loads of the corresponding section and energy available within the corresponding section from one or a combination of a local energy generator and a local energy storage, wherein the edge has a property constraining throughput of energy through the switch in a direction of a power flow;

solve an optimization problem to determine a state of each of the plurality of edges of the graph-based representation governing the power flow of the available energy optimizing a cost function of the properties of the plurality of nodes given the graph-based representation of the power distribution system as a constraint, wherein the cost function includes different components directed to different objectives of the optimization problem, such that the optimization problem is a multi-objective optimization, wherein the different objectives comprise minimizing system total lost energy, minimizing system total number of switch operations, minimizing system maximum section isolation durations, minimizing system maximum section isolation frequency, minimizing maximum difference of isolation duration among any two feeder sections, and minimizing maximum difference of isolation frequencies among any two feeder sections, wherein the objectives are defined for a set of consecutive time steps, and at least some of the edges have different statues at different time steps;

transform the determined state of each of the plurality of edges into control commands for states of at least some switches of the power distribution system;

submit the control commands to at least some switches of the power distribution system to cause a change in the power flow of the available energy; and control the power flow of available energy in the power distribution based on the submitted control commands.

2. The control system of claim 1, wherein the constraint defined by the graph-based representation includes one or a combination of a potential of the power exchange between the nodes, a constraint on direction of the power flow of each edge, a constraint on a throughput of the power flow at each edge, a power balance between power flowing into and out of each non-isolated node, and a radial constraint on a radial path formed by multiple edges.

3. The control system of claim 1, wherein the energy available to the power distribution system is less than a demanded energy due to an adversarial event, and wherein the control system updates a nominal graph-based representation of the power distribution system based on a type of the adversarial event to collect the graph-based representation of the power distribution system.

4. The control system of claim 1, wherein the optimized states of the edges are transformed into the control commands based on the states of the edges and current states of the switches.

5. The control system of claim 1, wherein the property of the edge constraints throughput of the energy through the switch in the direction of the power flow to be not greater than the throughput of the switch defined by its type and a state of a parent edge connecting the node with a parent node, wherein a state of each node defines the amount of power flowing through a corresponding switch.

6. The control system of claim 1, wherein the control system transforms the multi-objective optimization into a single objective optimization by defining its objective as maximizing a sum of a first item defined as a weighted sum of satisfied degrees for all multiple objectives, and a second item defined as minimal of weighted satisfied degree among all multiple objectives.

7. The control system of claim 6, wherein the satisfied degree of each objective is defined using a generalized Rectified Linear Unit (ReLU) action function generalized with an upper threshold as 1.0 and positive-directional or negative-directional gradient defined by the minimal and maximal objective values.

8. The control system of claim 1, wherein the optimization problem is a non-linear optimization problem with mixed binary and continuous variables and logic operations and solved using a non-linear solver.

9. The control system of claim 1, wherein the optimization problem is transformed into a mixed-integer linear programming problem (MILP) and solved using a MILP solver.

10. The control system of claim 9, where the optimization problem is augmented by replacing each generalized ReLu function, binary operation, and logic operation with an auxiliary optimization problem described by a linear objective function constrained by a set of linear feasible bounds.

11. The control system of claim 1, wherein the optimization problem is solved by a machine learning solution with a physics-informed neural network (PINN) that solves the optimization problem by training the PINN to minimize a lost function including the cost function and penalty of constraint violations, wherein inputs of PINN are a set of adversarial events defined given graph-based representation, and outputs are a set of corresponding switch statuses at each time step.

12. The control system of claim 1, wherein the controlling the power flow of the power distribution system is executed upon a given graph-based representation corresponding to an adversarial event occurring on the power distribution, wherein the adversarial event affects one or a combination of available power from the main grid, on/off status of switches, the throughput of a switch, and amount or status of storages or generations or line segments within the sections.

13. The control system of claim 1, wherein the sections of the power distribution system are formed by opening all switches, and each connected area is designed as a section of the distribution system, wherein the section includes a set of buses connected with renewable generators, electrical energy storing systems, loads, and line segments connected between buses.

14. The control system of claim 1, wherein the controlling the power flow of the power distribution system is executed either on a static time horizon covering all time steps within the entire period of the adversarial event or in a temporal rolling manner to revisit and update node and edge statues throughout the period of the adversarial event.

15. The control system of claim 1, wherein the section in the power distribution system is divided into two or more sections by adding one or more extra normally closed switches, wherein placements of the extra switches are determined by minimizing multiple cost functions, wherein the multiple cost functions include at least two of a minimization of an annualized cost for switches, a minimization of a maximum connected net loads among sections connected by the extra switches, a maximum average N−1 contingency duration for sections connected to the extra switches, a minimization of expected operation cost for all plausible normal operation states for the power distribution system, a minimization of a total expected lost energy for plausible adversarial events, a minimization of a total expected number of switch operations for plausible adversarial events, a minimization of an expected maximum section isolation durations for plausible adversarial events, a minimization of an expected maximum section isolation frequency for plausible adversarial events, a minimization of an expected maximum difference of isolation duration among any two feeder sections for plausible adversarial events, and a minimization of an expected maximum difference of isolation frequencies among any two feeder sections for plausible adversarial events.

16. The control system of claim 1, wherein one extra loop operated as radial is created by adding one normally open switches between two radial paths, wherein a placement of the extra switch is determined by minimizing multiple cost functions, wherein the multiple cost functions include at least two of a minimization of an annualized cost for switches, a minimization of a negative of maximal pick-up net loads by the extra switch, a minimization of an expected operation cost for all plausible normal operation states for the system, a minimization of a total expected lost energy for plausible adversarial events, a minimization of a total expected number of switch operations for plausible adversarial events, a minimization of an expected maximum section isolation durations for plausible adversarial events, a minimization of an expected maximum section isolation frequency for plausible adversarial events, a minimization of an expected maximum difference of isolation duration among any two feeder sections for plausible adversarial events, and a minimization of an expected maximum difference of isolation frequencies among any two feeder sections for plausible adversarial events.

17. The control system of claim 1, wherein one extra electricity storage system is added into the power distribution system at a location determined by minimizing multiple cost functions, wherein the multiple cost functions include at least two of a minimization of an annualized cost for storages, a minimization of a negative of power discharged capacities from the storages, a minimization of an expected operation cost for all plausible normal operation states for the system, a minimization of a total expected lost energy for plausible adversarial events, a minimization of a total expected number of switch operations for plausible adversarial events, a minimization of an expected maximum section isolation durations for plausible adversarial events, a minimization of an expected maximum section isolation frequency for plausible adversarial events, a minimization of an expected maximum difference of isolation duration among any two feeder sections for plausible adversarial events, and a minimization of an expected maximum difference of isolation frequencies among any two feeder sections for plausible adversarial events.

18. The control system of claim 1, wherein the power distribution system includes a radial path with at least two switches in the normally closed state connected on the radial path directly enabled splitting the radial path into smaller sections and at least one switch in the normal open state enabled rerouting the radial path to alternative power supply.

19. A control system for controlling a power flow of available energy in a power distribution system, comprising: a processor; and a memory having instructions stored thereon that, when executed by the processor, cause the control system to:
collect a graph-based representation of the power distribution system as a radial tree of a plurality of nodes connected by a plurality of edges, wherein each node of the plurality of nodes represents a section of the power distribution system isolated by one or more switches from other parts of the power distribution system when the one or more switches are at open positions, wherein each edge of the plurality of edges connecting a node with a neighboring node represents a switch that connects a section represented by the node with a neighboring section represented by the neighboring node, wherein each of the plurality of nodes has a property of power demand of a corresponding section governed by a difference between energy demanded by loads of the corresponding section and energy available within the corresponding section from one or a combination of a local energy generator and a local energy storage, wherein the edge has a property constraining throughput of energy through the switch in a direction of a power flow;
solve an optimization problem to determine a state of each of the plurality of edges of the graph-based representation governing the power flow of the available energy optimizing a cost function of the properties of the plurality of nodes given the graph-based representation of the power distribution system as a constraint, wherein the cost function includes different components directed to different objectives of the optimization problem, such that the optimization problem is a multi-objective optimization, wherein the control system transforms the multi-objective optimization into a single objective optimization by defining its objective as maximizing a sum of a first item defined as a weighted sum of satisfied degrees for all multiple objectives, and a second item defined as minimal of weighted satisfied degree among all multiple objectives, wherein the satisfied degree of each objective is defined using a generalized Rectified Linear Unit (ReLU) action function generalized with an upper threshold as 1.0 and positive-directional or negative-directional gradient defined by the minimal and maximal objective values;
transform the determined state of each of the plurality of edges into control commands for states of at least some switches of the power distribution system;
submit the control commands to at least some switches of the power distribution system to cause a change in the power flow of the available energy; and
control the power flow of available energy in the power distribution based on the submitted control commands.

20. A control system for controlling a power flow of available energy in a power distribution system, comprising: a processor; and a memory having instructions stored thereon that, when executed by the processor, cause the control system to:
collect a graph-based representation of the power distribution system as a radial tree of a plurality of nodes connected by a plurality of edges, wherein each node of the plurality of nodes represents a section of the power distribution system isolated by one or more switches from other parts of the power distribution system when the one or more switches are at open positions, wherein each edge of the plurality of edges connecting a node with a neighboring node represents a switch that connects a section represented by the node with a neighboring section represented by the neighboring node, wherein each of the plurality of nodes has a property of power demand of a corresponding section governed by a difference between energy demanded by loads of the corresponding section and energy available within the corresponding section from one or a combination of a local energy generator and a local energy storage, wherein the edge has a property constraining throughput of energy through the switch in a direction of a power flow;

solve an optimization problem to determine a state of each of the plurality of edges of the graph-based representation governing the power flow of the available energy optimizing a cost function of the properties of the plurality of nodes given the graph-based representation of the power distribution system as a constraint, wherein the optimization problem is transformed into a mixed-integer linear programming problem (MILP) and solved using a MILP solver, wherein the optimization problem is augmented by replacing each of generalized Rectified Linear Unit (ReLu) functions, binary operations, and logic operations with an auxiliary optimization problem described by a linear objective function constrained by a set of linear feasible bounds;

transform the determined state of each of the plurality of edges into control commands for states of at least some switches of the power distribution system;

submit the control commands to at least some switches of the power distribution system to cause a change in the power flow of the available energy; and control the power flow of available energy in the power distribution based on the submitted control commands.

\* \* \* \* \*